United States Patent
Horita et al.

(10) Patent No.: US 9,983,022 B2
(45) Date of Patent: May 29, 2018

(54) VEHICLE POSITION ESTIMATION SYSTEM, DEVICE, METHOD, AND CAMERA DEVICE

(71) Applicant: HITACHI AUTOMOTIVE SYSTEMS, LTD., Hitachinaka-shi, Ibaraki (JP)

(72) Inventors: Yuki Horita, Tokyo (JP); Taisetsu Tanimichi, Hitachinaka (JP); Hiroshi Kuroda, Hitachinaka (JP); Tomoichi Ebata, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days. days.

(21) Appl. No.: 15/100,398

(22) PCT Filed: Nov. 19, 2014

(86) PCT No.: PCT/JP2014/080570
§ 371 (c)(1),
(2) Date: May 31, 2016

(87) PCT Pub. No.: WO2015/083538
PCT Pub. Date: Jun. 11, 2015

(65) Prior Publication Data
US 2016/0305794 A1  Oct. 20, 2016

(30) Foreign Application Priority Data

Dec. 6, 2013 (JP) .................. 2013-252614

(51) Int. Cl.
*G01C 21/36* (2006.01)
*G06K 9/78* (2006.01)
(Continued)

(52) U.S. Cl.
CPC ..... *G01C 21/3679* (2013.01); *G01C 21/3602* (2013.01); *G01S 5/16* (2013.01);
(Continued)

(58) Field of Classification Search
CPC ............ G01C 21/3602; G01C 21/3679; G06K 9/00791; G06K 9/00798; G06K 9/00818; G06K 9/78
See application file for complete search history.

(56) References Cited

U.S. PATENT DOCUMENTS

2013/0101157 A1* 4/2013 Li ................... G06K 9/00805
382/103
2015/0142248 A1* 5/2015 Han ................. G01C 21/3602
701/23

FOREIGN PATENT DOCUMENTS

JP 09-152348 A 6/1997
JP 2008-051612 A 3/2008
(Continued)

OTHER PUBLICATIONS

International Search Report of PCT/JP2014/080570 dated Mar. 3, 2015.
(Continued)

*Primary Examiner* — Kimberly S Berona
*Assistant Examiner* — Anshul Sood
(74) *Attorney, Agent, or Firm* — Mattingly & Malur, PC

(57) ABSTRACT

An onboard control device that is installed at a vehicle acquires land mark information including position information of a landmark which can be recognized on a road in which the vehicle is estimated to travel by a camera, a landmark image for recognition, a recognition evaluation value that represents ease of the recognition successfully performed and so on, and selects a landmark to be a subject for recognition based on the recognition evaluation value included in the landmark information. The onboard control device further evaluates the recognition results of the landmark to be a subject for recognition, and transmits the recognition results to the server with the landmark image recognized by the camera. The server aggregates the recog- (Continued)

nition evaluation results of the landmark and the recognized images and reflects them in the recognition evaluation values for the landmark information and landmark images to be transmitted to the onboard control device.

19 Claims, 21 Drawing Sheets

(51) Int. Cl.
    *G06K 9/00*     (2006.01)
    *G01S 5/16*     (2006.01)
    *H04N 1/00*     (2006.01)
    *H04N 7/18*     (2006.01)
    *G01S 19/42*     (2010.01)
    *H04N 101/00*     (2006.01)

(52) U.S. Cl.
    CPC ..... *G06K 9/00798* (2013.01); *G06K 9/00818* (2013.01); *G06K 9/00825* (2013.01); *G06K 9/78* (2013.01); *H04N 1/00244* (2013.01); *H04N 7/185* (2013.01); *G01S 19/42* (2013.01); *H04N 2101/00* (2013.01); *H04N 2201/0084* (2013.01)

(56) References Cited

FOREIGN PATENT DOCUMENTS

| | | |
|---|---|---|
| JP | 2009-058429 A | 3/2009 |
| JP | 2011-113245 A | 6/2011 |
| JP | 2012-203722 A | 10/2012 |
| JP | 2013-015341 A | 1/2013 |
| JP | 2013-50412 A | 3/2013 |

OTHER PUBLICATIONS

Japanese Office Action received in corresponding Japanese Application No. 2013-252614 dated Feb. 6, 2018.

\* cited by examiner

FIG.3

| 351 | 352 | 353 | 354 | 355 | 356 | 357 | 358 | 359 | |
|---|---|---|---|---|---|---|---|---|---|
| LANDMARK ID | LANDMARK CLASSIFICATION | CORRESPONDING ROAD | POSITION INFORMATION (X,Y,Z) | ENVIRONMENT | SUBJECT RECOGNITION RANGE | LANDMARK IMAGE | RECOGNITION EVALUATION VALUE | POSITION ESTIMATION EVALUATION VALUE | ... |
| 7100 | SIGN ("NO ENTRY") | ROAD LINKS (7002,7003) NOT IN LANE | (29,-1.0, 2.0) | DAY-TIME | (7001,7002) [70,100] | IMAGE 8100-1 | 70 | B | ... |
| | | | | | (7002,7003) [0,29] | IMAGE 8100-2 | 95 | A | |
| | | | | NIGHT-TIME | (7002,7003) [0,29] | IMAGE 8100-3 | 50 | C | ... |
| 7101 | SIGN (30 KM/H SPEED LIMIT) | ROAD LINKS (7003,7004) NOT IN LANE | (150,-1.0, 2.0) | DAY-TIME | (7003,7004) [100,150] | IMAGE 8101-1 | 90 | A | ... |
| | | | | NIGHT-TIME | (7003,7004) [120,150] | IMAGE 8101-2 | 50 | B | |
| 7110 | PAINTED MARKING (TURN LEFT OR STRAIGHT AHEAD) | ROAD LINKS (7003,7004) LANE 7080 | (190,1.5, 0.0) | DAY-TIME | (7003,7004) [170,190] | IMAGE 8110-1 | 60 | A | ... |
| | | | | NIGHT-TIME | (7003,7004) [180,190] | IMAGE 8110-2 | 15 | B | |
| 7111 | PAINTED MARKING (TURN RIGHT) | ROAD LINKS (7003,7004) LANE 7081 | (190,3.5, 0.0) | DAY-TIME | (7003,7004) [170,190] | IMAGE 8111-1 | 50 | A | ... |
| | | | | NIGHT-TIME | (7003,7004) [180,190] | IMAGE 8111-2 | 15 | B | |
| ... | ... | ... | ... | | ... | ... | ... | ... | ... |
| 7120 | STOP LINE | ROAD LINKS (7003,7004) LANE 7080 LANE 7081 | (200,0.0, 0.0) | DAY-TIME | (7003,7004) [180,200] | IMAGE 8120-1 | 15 | D | ... |
| | | | | NIGHT-TIME | (7003,7004) [190,200] | IMAGE 8120-2 | 15 | E | |
| ... | ... | ... | ... | | ... | ... | ... | ... | ... |
| 7130 | CROSSWALK | ROAD NODE 7004 | (-10.0, -12.0,0.0) | DAY-TIME | (7003,7004) [190,210] | IMAGE 8130-1 | 60 | A | ... |
| | | | | NIGHT-TIME | (7003,7004) [200,210] | IMAGE 8130-2 | 15 | B | |
| ... | ... | ... | ... | | ... | ... | ... | ... | ... |
| 7140 | TRAFFIC LIGHT | ROAD NODE 7004 | (-11.0,-6.0, 8.0) | DAY-TIME | (7003,7004) [100,210] | IMAGE 8140-1 | 50 | C | ... |
| | | | | NIGHT-TIME | (7003,7004) [120,210] | IMAGE 8140-2 | 90 | A | |
| ... | ... | ... | ... | | ... | ... | ... | ... | ... |

FIG.4
IMAGE 8100-1
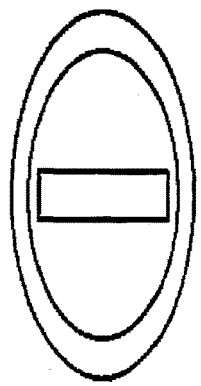
IMAGE 8100-2
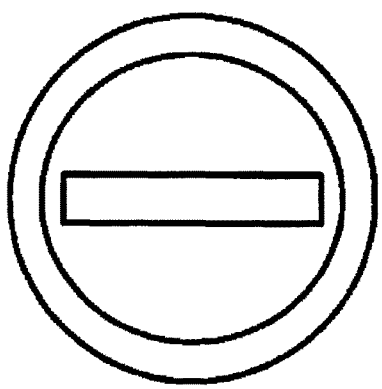
IMAGE 8110-1
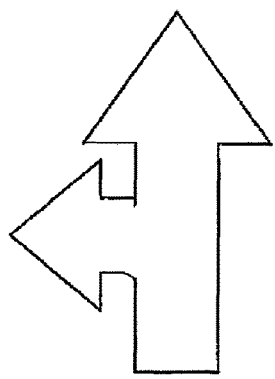
IMAGE 8111-1
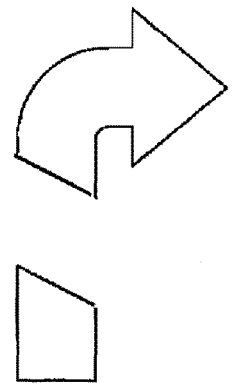

FIG.5

| | 371 | 372 | 373 | 374 | 375 | 376 | 377 | 378 | 379 | |
|---|---|---|---|---|---|---|---|---|---|---|
| | LANDMARK ID | LANDMARK CLASSIFICATION | CORRESPONDING ROAD | POSITION INFORMATION (X,Y,Z) | ENVIRONMENT | SUBJECT RECOGNITION RANGE | LANDMARK IMAGE | RECOGNITION EVALUATION VALUE | POSITION ESTIMATION EVALUATION VALUE | ... |
| | 7100 | SIGN ("NO ENTRY") | ROAD LINKS (7002,7003) NOT IN LANE | (29,-1.0, 2.0) | DAY-TIME | (7001,7002) [70,100] | IMAGE 8100-1 | 70 | B | ... |
| | | | | | | (7002,7003) [0,29] | IMAGE 8100-2 | 95 | A | |
| | 7101 | SIGN (30 KM/H SPEED LIMIT) | ROAD LINKS (7003,7004) NOT IN LANE | (150,-1.0, 2.0) | DAY-TIME | (7003,7004) [100,150] | IMAGE 8101-1 | 90 | A | ... |
| | 7110 | PAINTED MARKING (TURN LEFT OR STRAIGHT AHEAD) | ROAD LINKS (7003,7004) LANE 7080 | (190,1.5, 0.0) | DAY-TIME | (7003,7004) [170,190] | IMAGE 8110-1 | 60 | A | ... |
| | 7111 | PAINTED MARKING (TURN RIGHT) | ROAD LINKS (7003,7004) LANE 7081 | (190,3.5, 0.0) | DAY-TIME | (7003,7004) [170,190] | IMAGE 8111-1 | 50 | A | ... |
| | 7130 | CROSSWALK | ROAD NODE 7004 | (-10.0, -12.0,0.0) | DAY-TIME | (7003,7004) [190,210] | IMAGE 8130-1 | 60 | A | ... |
| | 7140 | TRAFFIC LIGHT | ROAD NODE 7004 | (-11.0,-6.0, 8.0) | DAY-TIME | (7003,7004) [100,210] | IMAGE 8140-1 | 30 | C | ... |
| | ... | ... | ... | ... | | ... | ... | ... | | ... |

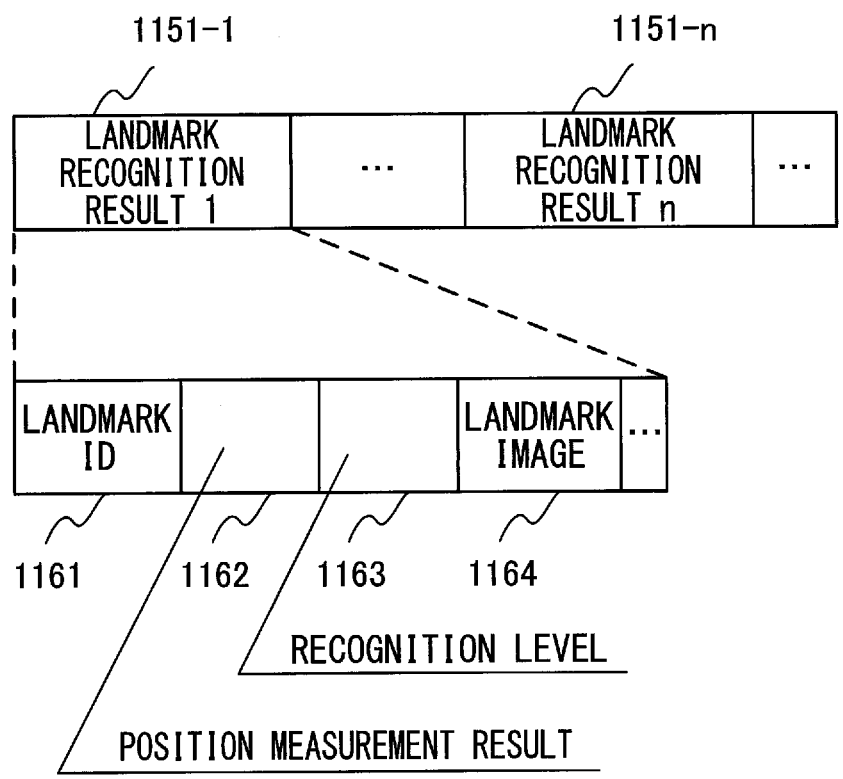

VEHICLE POSITION ESTIMATION SYSTEM, DEVICE, METHOD, AND CAMERA DEVICE

TECHNICAL FIELD

The subject matter disclosed in this specification relates to a system that performs estimation of the position of a vehicle, and to a device, a server, and a program that are employed in that system.

BACKGROUND ART

In order to control the traveling of a vehicle correctly, it is necessary to estimate the position of the vehicle upon road map data in an accurate manner. However, since position measurement errors of around several tens of meters can be generated by the GNSS (Global Navigation Satellite System), it is difficult to estimate an accurate position for the vehicle within the road along with it is traveling, even if corrections are performed by using map data and map matching.

Accordingly, a system is per se known that controls the traveling of the vehicle by using information such as the shapes of roads (curves, intersections, and the like), the attributes of roads (speed limits, road gradients, and the like), and so on. The techniques disclosed in Patent Document #1 and Patent Document #2 are per se known as prior art techniques by which enhancement of the accuracy of estimation of the position of a subject vehicle is implemented.

In Patent Document #1, a technique is disclosed for enhancing the accuracy of estimation of the position of the vehicle by attaching a camera to the vehicle, by recognizing, from the camera images obtained during traveling, landmarks which are characteristic objects from which the position of the vehicle can be accurately known such as traffic lights, traffic signs, lines painted upon the road and so on, and by implementing appropriate corrections.

And, in Patent Document #2, a technique is disclosed for implementing management of information for a landmark for which the level of accuracy of existence is high by making a decision as to whether or not to report the result of recognition to a map center, in consideration of the likelihood of the result of landmark recognition and/or of the conditions during photography of the image.

CITATION LIST

Patent Literature

Patent Document #1: Japanese Laid-Open Patent Publication No. H9-152348
Patent Document #2: Japanese Laid-Open Patent Publication No. 2008-51612

SUMMARY OF INVENTION

Technical Problem

With the technique disclosed in Patent Document #1, the position of the vehicle is estimated at high accuracy by recognizing one or more landmarks whose position has been determined in advance, by using an image from a camera that has been installed in the vehicle.

However, since no consideration is given to the truth or falsity of the landmark information that is used for recognition or to the ease of performing recognition, accordingly there is a possibility that, by using landmark information that is erroneous or by using landmark information that is difficult to recognize, it will not be possible to recognize some landmarks. Due to this, there is a possibility that it will not be possible to perform estimation of the position of the vehicle at high accuracy, or that estimation of the position of the vehicle may be performed erroneously due to mistaken recognition of some landmarks.

In connection with this problem, a technique is disclosed in Patent Document #2 for eliminating erroneous landmark information from the map data by feeding back the results of landmark recognition whose reliability is high to the map center. By doing this, it becomes possible to suppress the problem described above that originates in erroneous landmark information.

However, since the burden of calculation for processing images for landmark recognition is high, accordingly it is difficult to implement recognition processing for all of the landmark information with an onboard device whose processing capability is limited. While, in this case, it has been considered to limit the landmark information that is to be the subject of recognition processing, if this information is limited in a fixed manner by using classifications (such as traffic signs, crosswalks, or the like), then there is a possibility that landmarks that are difficult to recognize may be selected even if landmark information is actually present that can be recognized, so that position estimation at high accuracy fails.

The object of the present invention is to implement enhancement of the accuracy of estimation of the position of a vehicle, while giving due attention to reduction of the burden of processing for recognition of landmarks.

Solution to Technical Problem

In order to solve the problem described above, the present invention is to provide a device that estimates a position of a vehicle using a characteristic object included in an image that is captured by an image capturing device mounted to the vehicle, and a server that is connected to that device via a network, or a vehicle position estimation system including the device and the server. The server comprises: a first control unit; a first storage unit that stores landmark information, that is information related to an image of a characteristic object; and a first communication unit that transmits the landmark information to the device via the network; and the device comprises: a second communication unit that receives captured image information, that is information related to an image captured by the image capturing device, and also receives the landmark information from the server via the network; a second storage unit that stores the landmark image information; and a second control unit that executes: recognition processing in which information related to an image of a characteristic object included in the captured image information is recognized based on the landmark information stored in the second storage unit; position estimation processing in which the position of the vehicle is estimated based on the information related to an image of a characteristic object that has been recognized; and landmark information selection processing in which the landmark information used in the recognition processing is selected from the second storage unit based on a recognition evaluation value that represents ease of the recognition processing successfully performing recognition for each item of landmark information.

Advantageous Effects of Invention

According to the present invention, it is possible to enhance the accuracy of estimation of the position of a vehicle, while giving due attention to reduction of the burden of processing for recognition of landmarks.

BRIEF DESCRIPTION OF DRAWINGS

FIG. 3 is an explanatory figure showing an example of the data structure of a landmark information data group that is maintained by this vehicle position estimation support server according to the first embodiment of the present invention;

FIG. 4 is an explanatory figure showing examples of landmark images in this landmark information data group maintained by the vehicle position estimation support server and/or by an onboard control device according to the first embodiment of the present invention;

FIG. 5 is an explanatory figure showing an example of the data structure of a landmark information data group that is maintained by the onboard control device according to the first embodiment of the present invention;

FIG. 21 is an explanatory figure showing an example of the format of a landmark recognition result message transmitted by a camera device group according to the second embodiment of the present invention.

DESCRIPTION OF EMBODIMENTS

Embodiments of the present invention will now be explained with reference to the drawings.
Embodiment #1

Figure 1:
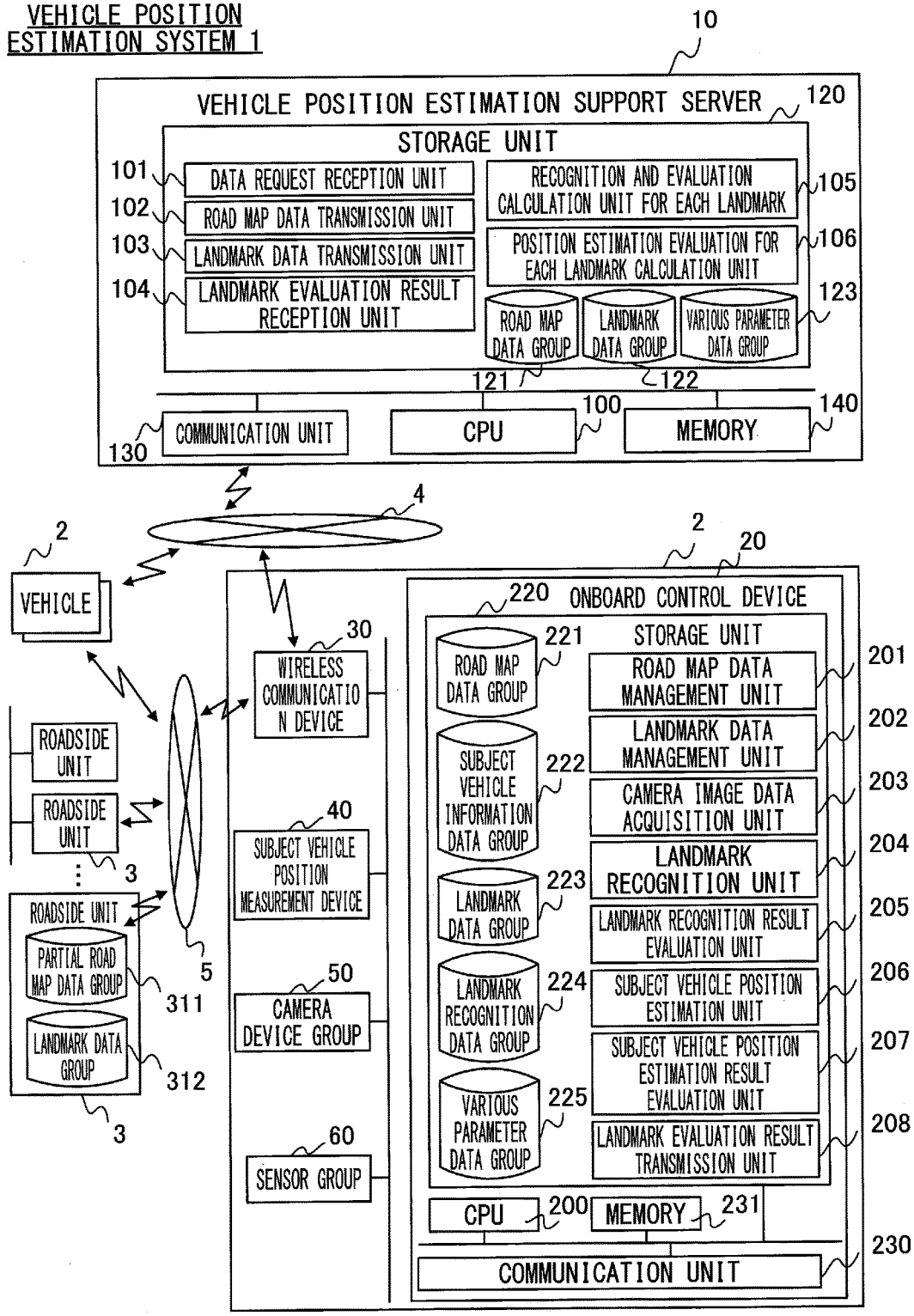
FIG. 1 is a functional block diagram showing an example of the structure of a vehicle position estimation system according to a first embodiment of the present invention.

FIG. 1 is a functional block diagram showing an example of the structure of a vehicle position estimation system according to a first embodiment of the present invention.

As shown in FIG. 1, the vehicle position estimation system 1 according to this embodiment is, for example, a vehicle position estimation system that supports estimation of the position of one or more vehicles 2, and comprises: those one or more vehicles 2; one or more roadside units 3 for supplying information to the vehicles 2 by wireless communication from road infrastructure such as back-end systems possessed by a road operator or the like; a vehicle position estimation support server 10 that supplies to the vehicles 2 information for supporting estimation of the positions of the one or more vehicles 2; a network 4 that connects between the one or more vehicles 2 and the vehicle position estimation support server 10 so that they are capable of mutual communication; and a short distance wireless network 5 that connects between the one or more vehicles 2 and the one or more roadside units 3 so that they are capable of mutual communication.

A representative one of the vehicles 2 comprises an onboard control device 20, a wireless communication device 30, a subject vehicle position measurement device 40, a camera device group 50, and a sensor group 60.

The onboard control device 20 is, for example, an ECU or the like that is mounted to the vehicle 2, and may comprise a processing unit, a storage unit 220, and a communication unit 230. It should be understood that the form of the onboard control device 20 is not to be considered as being particularly limited; for example, it would be possible to employ a vehicle position estimation device for performing estimation of the position of the vehicle 2, or a travel control device for implementing an advanced driving support system for the vehicle 2 (i.e. an ADAS: Advanced Driver Assistance System), or a nearby object detection processing device that performs detection of nearby objects from photographic images produced by the camera device group 50, or an external device such as a smartphone or the like that is connected to the vehicle network by the user of the vehicle.

The processing unit may include, for example, a CPU 200 (Central Processing Unit: a central calculation processing device) and a memory 231 such as a RAM (Random Access Memory) or the like, and implements the functions of the onboard control device 20 by executing a predetermined operating program that is stored in the storage unit 220.

The storage unit 220 includes one or more storage devices such as, for example, an HDD (Hard Disk Drive), a flash memory, a ROM (Read Only Memory) or the like, and stores the program that is executed by the processing unit and groups of data that are required for implementation of this system and so on. In this embodiment, in particular, programs for implementation of a road map data management unit 201 that acquires road map data related to the surroundings of the vehicle 2, a landmark data management unit 202 that acquires information about landmarks upon the traveling path of the vehicle 2, a camera image data acquisition unit 203 that acquires image data photographed by the camera device group 50, a landmark recognition unit 204 that, along with recognizing predetermined landmarks present in the image data that has been acquired, also calculates parameters of various types such as relative distances and so on, a landmark recognition result evaluation unit 205 that evaluates the results of recognition of landmarks that are subjects for recognition, a subject vehicle position estimation unit 206 that estimates the position of the subject vehicle on the basis of the results of landmark recognition by the subject vehicle position measurement device 40 and/or the landmark recognition unit 204 and so on, a subject vehicle position estimation result evaluation unit 207 that evaluates the results of estimation of the position upon the road map of the subject vehicle, a landmark evaluation result transmission unit 208 that transmits the results of evaluation of landmark recognition and of subject vehicle position estimation to the vehicle position estimation support server 10 via the network 4, and the like are stored in the storage unit 220, as well as a road map data group 221, a subject vehicle information data group 222, a landmark data group 223, a landmark recognition data group 224, a various parameter data group 225, and so on.

The communication unit 230 may include, for example, a network card or the like that conforms to a communication standard such as Ethernet (registered trademark) or CAN (Controller Area Network) or the like, and performs transmission and reception of data to and from other devices mounted to the vehicle 2 on the basis of protocols of various types. It should be understood that the manner of connection between the communication unit 230 and other devices mounted to the vehicle 2 is not limited to being cable connection such as Ethernet or the like; it would also be acceptable to employ a short distance wireless connection method such as Bluetooth (registered trademark) or a wireless LAN (Local Area Network) or the like.

The wireless communication device 30 may include, for example, a network card or the like that conforms to a long distance wireless communication standard such as LTE (Long Term Evolution) or to a short distance wireless communication standard such as a wireless LAN or DSRC (Dedicated Short Range Communications) or the like, and is configured so that it becomes possible to perform mutual data communication with, for example, the vehicle position estimation support server 10, or one or a plurality of the roadside units 4, or wireless communication devices 30 mounted to one or a plurality of other vehicles, or one or a plurality of communication terminals (not shown in the figures) possessed by persons or the like.

The wireless communication device 30 performs data communication with the vehicle position estimation support server 10 via the network 4. Desirably, this wireless communication device 30 is connected to the network 4 by employing long distance wireless communication, and performs transmission and reception of data that has been generated on the basis of protocols of various types of, for example, the IP (Internet Protocol) system or the like. It should be understood that the wireless communication device 30 is not to be considered as being limited to performing long distance wireless communication; it would also be acceptable for it to be directly connected to the network 4 by using short distance wireless communication, or for it to be connected to the network 4 via some other communication device, such as one of the roadside units 3 or the like.

On the other hand, desirably, the wireless communication device 30 performs direct data communication via the short distance wireless network 5 with the roadside units 3, with wireless communication devices that are mounted to other vehicles 2, and/or with communication terminals that are possessed by persons. This may be implemented in, for example, a road-to-vehicle or vehicle-to-vehicle communication system. However, the wireless communication device 30 is not to be considered as being limited to short distance wireless communication; it would also be acceptable for it to perform long distance wireless communication so as to perform data communication with communication devices of various types via the network 4. Moreover, it would also be possible for the wireless communication device 30 to be adapted to operate in conformity with a combination of any two or more long distance wireless communication standards and/or short distance wireless communication standards.

The subject vehicle position measurement device 40 is a device for measuring the geographic position of the vehicle 2 and for supplying this information; for example, it may be equivalent to a GNSS reception device. This subject vehicle position measurement device 4 may be built so as simply to provide results of position measurement based upon the radio waves received from the GNSS satellites, or may be built so as also to perform position interpolation and error correction by utilizing information that can be acquired from the sensor group 60, such as the speed of movement of the vehicle 2 and the azimuth of its motion and so on.

It should be understood that the subject vehicle position measurement device 40 could be some device other than a GNSS reception device, provided that it is a device that measures the geographic position of the vehicle 2. For example, it would also be acceptable to arrange for the subject vehicle position measurement device 40 to acquire information that identifies the road along which the vehicle 2 is traveling and information that specifies the position of the vehicle 2 upon that road (for example, information that specifies the distance from the starting point of that road) from the roadside unit 4, and to perform measurement of the geographic position of the vehicle 2 on the basis thereof. Furthermore, while this information specifying the position of the vehicle 2 that the subject vehicle position measurement device 40 acquires is typically coordinate values such as latitude and longitude as will be described hereinafter, it would also be acceptable for it to be information other than that described above, provided that it is information that can be employed for specifying the road upon which the vehicle 2 is traveling. For example, this information which specifies the position of the vehicle 2 may be information that specifies the road along which the vehicle 2 is traveling and its position upon that road.

The camera device group 50 is installed to the vehicle 2 so as to be capable of photographing the exterior of the vehicle 2, and is adapted to be capable of supplying image data or video data showing the situation in the surroundings of the vehicle 2, which is photographed repeatedly, to the onboard control device 20 via an onboard network or the like. It should be understood that this camera device group 50 may be a monocular camera, or may be a stereo camera to which a plurality of photographic elements are mounted, or may be any desired combination of monocular cameras and stereo cameras, or may be an integrated unit of one or more cameras and an ECU that performs other processing. Furthermore, while in this explanation of the present invention it is supposed that the direction of photography is forward from the vehicle 2, a variation would be acceptable in which photography is performed sideways or rearward from the vehicle.

The sensor group 80 is a device group that detects the states of various components of the vehicle 2 (for example, the running speed, the steering angle, the amount of actuation of the accelerator, the amount of actuation of the brake, and so on), and that periodically outputs the values of these states that have been detected upon an onboard network such as, for example, CAN or the like. Thereby, it becomes possible for devices that are connected to the onboard network, including the travel control device 20, to acquire the values of the states of these various components.

The road map data group 221 of the onboard control device 20 is a collection of data related to a digital road map, including information such as, for example, the network structure of the roads, their attributes (the classifications of the roads, their speed limits, their directions of progression, and so on), their shapes (the configurations of the road lanes, the configurations of intersections, and so on), and landmarks upon them (traffic signs, markings painted upon the surfaces of the roads, and so on). The subjects of this road map data group are not limited to relating to the area covered by the road map; for example, it would be acceptable for road map data for the entire world to be included, or for only road map data related to some specified region or country, such as Europe or America or the like to be included, or for only local road map data around the position of the vehicle 2 to be included. It should be understood that, in this specification, the term "road" means a path along which the vehicle is capable of traveling, and is not to be considered as being limited to public roads; it could also include private roads, and/or traveling paths within some facility such as a parking place or the like. Moreover, in addition to the above digital road map data, it would also be possible for the road map data group 221 further to include information about facilities present along the roads; and a landmark data group 223 that will be described hereinafter and so on may also be included.

The subject vehicle information data group 222 of the onboard control device 20 is a collection of data related to information that specifies the running state and so on of the subject vehicle, such as for example position information for the subject vehicle and information that can be acquired from the sensor group 60 via the onboard network and so on. It should be understood that the term "position information for the subject vehicle" means data related to the position of the subject vehicle, such as data specifying the geographic position information for the subject vehicle that has been measured by the subject vehicle position measurement device 40, and/or results of estimation by the subject vehicle position estimation unit 206 and so on.

The landmark data group 223 of the onboard control device 20 is a collection of data related, for example, to detailed information about landmarks of various types included in the road map data group 221.

The landmark recognition data group 224 of the onboard control device 20 is a collection of data related, for example, to the results of processing of various types executed by the onboard control device 20 using the landmark information and so on.

The various parameter data group 225 of the onboard control device 20 is, for example, a collection of data related to parameters used by the onboard control device 20 related to the vehicle position estimation support system 1.

The roadside units 3 are devices that are installed, for example, at the sides of the roads or above the roads, and that are built so that they are able to perform wireless communication with the wireless communication devices 30 of one or a plurality of the vehicles 2. Furthermore, the roadside units 4 are connected to a road IT infrastructure system such as a road control center or a road traffic information center or the like that may, for example, be managed by a road business or by their contractors. For example, the roadside units 4 may be adapted to be capable of communicating with a central system such as a road control center or a road traffic information center or the like, and may be capable of distributing requested information from that central system to one or a plurality of vehicles 2 that are traveling along the road where the roadside units are installed.

For example, the roadside units 3 may be adapted to distribute information related to roads around the locations at which they are installed, and may distribute local map data including landmark information related to the surrounding roads, road event information such as accidents and/or congestion upon the surrounding roads, information specifying the states or the changeover timings of signals at intersections where they are installed, and so on. In particular, for example, if the roadside units 3 distribute map data including landmark information related to roads around them, then partial road map data groups 311, which are map data for distribution related to roads surrounding the subject, landmark information data groups 312 of landmarks on those surrounding roads, and so on may be stored in storage units (not shown) of the roadside units 3. And the roadside units 3 generate messages in a predetermined format that include map data related to their surrounding roads from the data stored in the storage units of the roadside units 3, and transmit these messages in a predetermined format to one or a plurality of the vehicles 2. Due to this, a vehicle 2 that has received such a message is enabled to acquire road map data and landmark information for the surrounding roads during traveling, even if it cannot acquire such information from the vehicle position estimation support server 10.

The network 4 is a communication network that may be built as any desired combination of a line exchange network and/or a packet exchange network, and uses wireless and/or cable as medium. The network 4 is adapted so that data can be mutually transmitted and received between the vehicle position estimation support server 10 and the wireless communication devices 30 that are mounted to the vehicles 2. Using the wireless communication devices 30, the onboard control devices 20 are capable of performing communication with the vehicle position estimation support server 10 via the network 4.

The short distance wireless network 5 is a communication network that may be built as any desired combination of a line exchange network and/or a packet exchange network, and uses a short distance wireless system such as a wireless LAN or the like as medium. This short distance wireless network 5 is adapted so that mutual transmission and reception of data is possible between a plurality of the vehicles 2, or between the vehicles 2 and the roadside units 3. Via the wireless communication devices 30, the onboard control devices 20 are capable of performing communication with the other vehicles 2 and/or with the roadside units 3 via the short distance wireless network 5.

The vehicle position estimation support server 10 is, for example, a system or the like comprising a single server or a plurality of servers for supporting position estimation for the vehicle 2 at high accuracy, and comprises a processing unit, a storage unit 120, and a communication unit 130.

The processing unit is built to include, for example, a CPU 100 and a memory 140 such as a RAM or the like, and performs processing to implement the functions of the vehicle position estimation support server 10 by executing a predetermined operating program that is stored in the storage unit 120.

The storage unit 120 is built to include, for example, an HDD, a flash memory, a ROM, or the like, and a program executed by the processing unit and data groups and so on that are required for implementation of this system are stored therein. In this embodiment, in particular, programs for a data request reception unit 101 that receives messages requesting predetermined data from one or more of the vehicles 2, a road map data transmission unit 102 that transmits to one or more of the vehicles 2 road map data corresponding to those vehicles 2, a landmark data transmission unit 103 that transmits to one or more of the vehicles 2 landmark information corresponding to those vehicles 2, a landmark evaluation result reception unit 104 that receives from one or more of the vehicles 2 evaluation results related to the landmarks of that vehicle 2, a recognition evaluation value calculation unit 105 for each landmark that calculates a recognition evaluation value for each landmark on the basis of the results of evaluation related to one or more landmarks received by the landmark evaluation result reception unit 104, a recognition evaluation value for each landmark calculation unit 105 that calculates a recognition evaluation value for each landmark, a position estimation evaluation for each landmark calculation unit 106 that calculates the accuracy of position estimation for each landmark on the basis of the evaluation results related to one or more of the position estimations received by the landmark evaluation result reception unit 104, and so on, and the road map data group 121, the landmark data group 122, and the various parameter data group 123 and so on are stored in the storage unit 120.

The communication unit 130 is built to include a network card or the like that conforms to a cable LAN standard such as, for example, Ethernet or the like. And the communication unit 130 accesses the network 4, and transmits and receives data that has been generated on the basis of protocols of various types such as, for example, the IP system. It should be understood that the format for connection of the communication unit 130 to the network 4 should not be considered as being limited to cable connection such as Ethernet; short distance wireless connection such as a wireless LAN or the like would also be acceptable, or long distance wireless connection such as a mobile telephone communication system could also be employed.

In a similar manner to the road map data group 221 that is stored in the storage unit 220 of the onboard control device 20, the road map data group 121 of the vehicle position estimation support server 10 is a collection of data related to a digital road map that includes information such as, for example, the network structure of the roads, their attributes (the classifications of the roads, their speed limits, their directions of progression, and so on), their shapes (the configurations of their road lanes, the configurations of their intersections, and so on), and their landmarks (traffic signs, markings painted upon the surfaces of the roads, and so on).

The landmark data group 122 of the vehicle position estimation support server 10 is a collection of data related, for example, to detailed information about landmarks of various types that are included in the road map data group 121.

The various parameter data group 123 of the vehicle position estimation support server 10 is a collection of data related to parameters related to the vehicle position estimation support system 1 that are, for example, used by the vehicle position estimation support server 10.

Figure 2:
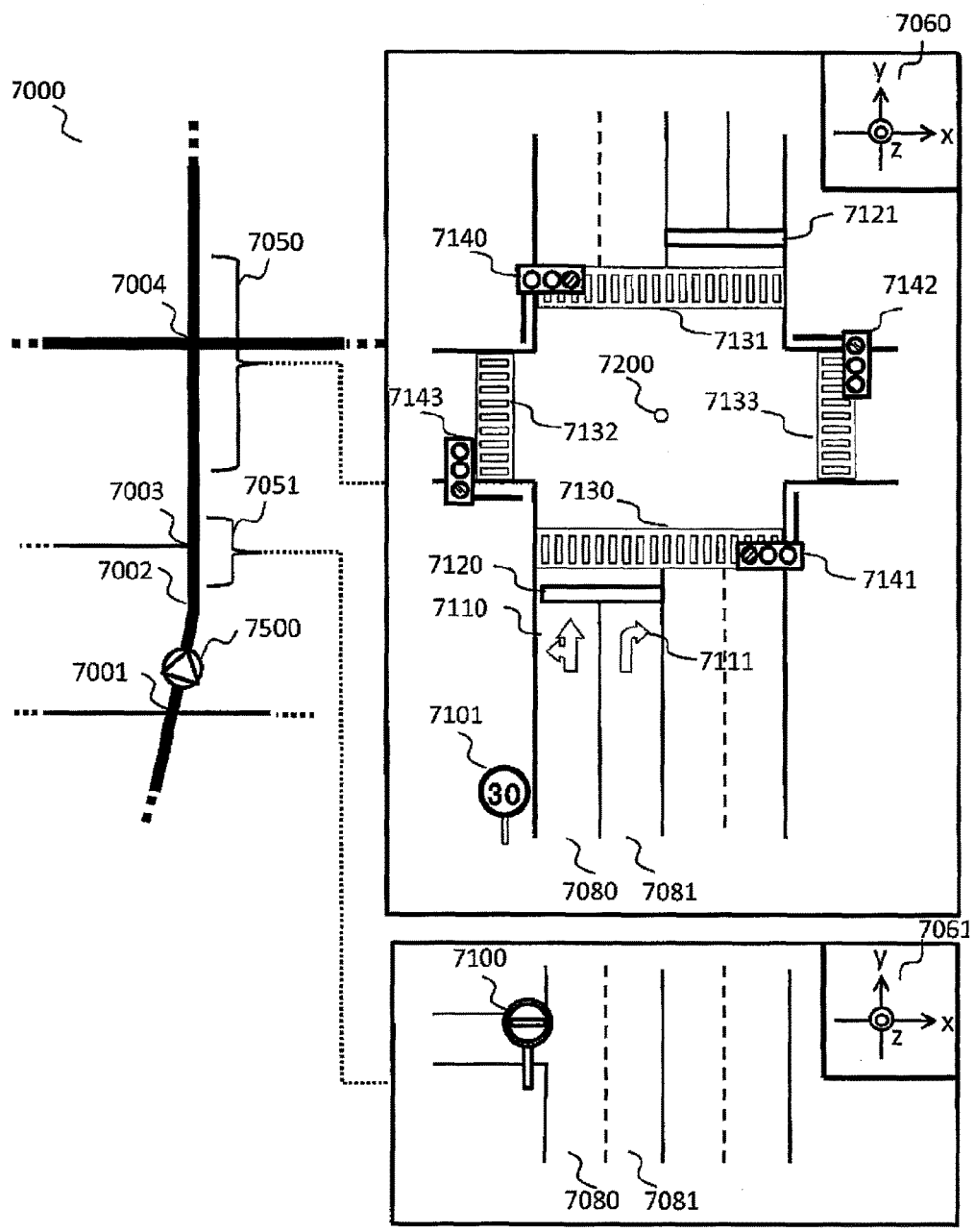
FIG. 2 is an explanatory figure showing an example of information stored in a road map data group that is maintained by a vehicle position estimation support server according to this first embodiment of the present invention.

FIG. 2 is an explanatory figure showing an example of information stored in the road map data group 121 that is held in the vehicle position estimation support server 10 of this first embodiment of the present invention. In concrete terms, FIG. 2 is a figure in which one portion of the road network is extracted, and is shown in a simulated manner as an example. A road map 7000 in the left portion of FIG. 2 displays the road network by solid lines, while detailed road maps 7050 and 7051 in the right portion of FIG. 2 are maps in which portions of the road network have been extracted and the shapes of the roads and the positions of the landmarks therein are enlarged and are shown in detail.

In the road map data group 121, the roads are formed as sets of road links that denote road sections and nodes that specify the end points of those road sections. The nodes are located at, for example, intersections where a plurality of roads intersect, ground points at which the shapes or the structures of the road links change, ground points at which attributes of the road links change, and so on. Each node has an identifier, i.e. a so-called node ID. In FIG. 2, node IDs 7001 through 7004 are shown as examples of nodes. In the following, the values of the node IDs will also be used as reference symbols for referring to the nodes that are identified by those node IDs. For example, the node that is identified by the node ID 7001 will simply be referred to as the node 7001.

On the other hand, in this specification, for example, the road links are represented by pairs of node IDs. In other words, the ID of the road link of the road section between the node 7001 and the node 7002 is represented as (7001, 7002). And, as an expression that distinguishes the direction of progression of the road links, in this specification, it will be supposed that the travel road section that progresses from the node 7000 to the node 7001 will be represented as the road link (7001, 7002), while the travel road section that progresses from the node 7002 to the node 7001 will be represented as the road link (7002, 7001). It should be understood that the method of representing the road links is not to be considered as being limited to the format described above; for is example, the road link (7001, 7002) may represent the road section including both directions between the node 7001 and the node 7002; or a travel road section may be represented in combination with data indicating its direction of progression; or it would also be possible to allocate two separate IDs (i.e. two link IDs) to a road link.

While the position 7500 of the subject vehicle is not normally included in the road map data group 121, this position is shown in the figure for convenience, since it is employed in the following explanation.

In the detailed road maps 7050 and 7051, 7060 and 7061 show the respective coordinate systems in this specification. In a detailed road map such as the map 7050 that represents a road intersection, for example, the point 7200 that is the center of the intersection may be taken as being the origin, the rightward direction in the figure (i.e. the eastward direction) may be taken as being the X axis, the upward direction in the figure (i.e. the northward direction) may be taken as being the Y axis, and the vertical direction in the figure may be taken as being the Z axis. On the other hand, in a detailed road map such as the map 7051 representing a road that extends between intersections, for example, the starting point of the subject road link (in other words, the node) may be taken as being the origin, the Y axis may be taken as being the direction of progression along the road link, the X axis may be taken as being the direction toward the center of the road from the left edge of the road lanes (7080 and 7081) (in the case of the right side traveling system, from the right edge), and the Z axis may be taken as being the vertical direction in the figure. It should be understood that the method of representing the detailed position upon a road is not to be considered as being limited to that described above.

In the detailed road maps 7050 and 7051, 7100 through 7142 are information related to the objects of road signs and signals and so on, and to marks painted upon the road surface. In this specification, it will be supposed that information specifying characteristic objects or painted marks whose positions upon this type of road map have been ascertained is termed landmark information. It should be understood that while, in the FIG. 2 example, only landmark information related to road traffic is shown and described, this should not be considered as being limitative; for example, characteristic buildings in the vicinity of the road and so on may also be treated as being landmark information.

Since any appropriate structure for the data structure of the road map data group 121 will be acceptable, including a per se known type such as for example a format that is employed in a so called onboard navigation device, accordingly explanation related thereto will be omitted.

An example of the data structure of the landmark information data group 112 will now be explained with reference to FIG. 3. In FIG. 3, part of the information related to the landmarks in the road net of FIG. 2 is shown in detail.

The items in the landmark ID column 351 are identifiers (IDs) for identifying the landmarks. In the following explanation, in some cases, it may happen that the value in this landmark ID column 351 is used as a reference symbol for referring to the landmark that is identified by its value. For example, in some cases it may happen that the landmark that is identified by the value "7100" in the landmark ID column 351 is referred to as the landmark 7100.

The landmark classification column 352 represents the classification of this landmark. For example, this classification may be a sign such as "no entry" or a speed limit or the like, a marking painted upon the road surface indicating a right or left turn lane or straight ahead, a traffic light, or the like.

The corresponding road column 353 represents the road link, the lane, or the road node at which this landmark is present, and, for example, the ID of the corresponding road object may be stored here.

The position information column 354 represents the position of this landmark upon the road specified in the corresponding road column 353. For each of the landmarks, a reference point that specifies its position according to a predetermined rule (for example, the central point of the shape of that landmark) is taken as being defined, and it will be supposed that the position given in this position information column 354 represents the position of this reference point. While this matter is not described in FIG. 3, along with the reference point, data that specifies the shape of the landmark may be further appended, and thereby it will be possible to represent the position of the landmark in three dimensional space in the road map data in a more accurate manner. It should be understood that, while the three dimensional position of the landmark is used as an example of the position information 354, it would also be acceptable for the position in the horizontal plane to be represented as a two dimensional position.

Information specifying the environment around the vehicle is stored in the environment column 355, and the columns 356 through 359 specify factors that constitute data in this environment. While in FIG. 3, as one example, the environment is classified along an axis of "day-time" and "night-time" as related to brightness around the vehicle 2, this should not be considered as being limitative; for example, it would also be acceptable to classify the environment along an axis of weather information such as "rain", "snow", "fog" or the like, or along a range of quantitative values for luminance, precipitation amount, or visibility or the like (for example, amounts of precipitation of 0 mm to 50 mm per hour, or of 50 mm to 100 mm of precipitation per hour), or along an axis or axes of any desired combination of the above (for example, along an axis of a combination of luminance and visibility).

The subject recognition range column 356 specifies a position range upon the road within which it is considered that it is possible to recognize this landmark in the environment specified in the environment column 355. For example, "(7001, 7002) [70, 100]" means that it is considered that, upon the road link (7001, 7002), in the direction from the node 7001 toward the node 7002, it is possible to recognize this landmark information within the position range of 70 m to 100 m.

Data is stored in the landmark image column 357 related to images of the landmarks that can be recognized by the camera mounted to the vehicle in the environments 355 and moreover under the conditions given in the subject recognition ranges 356. This could be a landmark image itself that has actually been photographed under those conditions, or could also be data specifying a characteristic value that has been extracted from such a landmark image (for example, a characteristic point image that is used in pattern matching during image recognition).

Evaluation values related to recognition of the landmark images 357 in the environments 355 and moreover under the conditions given by the subject recognition ranges 356 are stored in the recognition evaluation value column 358. These evaluation values related to recognition are intended to quantify and to represent the desirability of this landmark as a subject for landmark recognition; for example, the success ratio of landmark recognition may be cited as an example.

And evaluation values are stored in the position estimation evaluation value column 359 that are related to position estimates that have employed the recognition results for the landmark images 357 in the environments 355 and moreover under the conditions given by the subject recognition ranges 356. These evaluation values related to position estimation are intended to quantify and to represent the desirability of the result of position estimation based upon the results of recognition for this landmark; for example, the accuracy of position estimation may be cited as an example. In FIG. 3, it is supposed that the level of position estimation accuracy is shown in five stages: A (for example, the error is within 1 m), B (for example, the error is from 1 m to 3 m), C (for example, the error is from 3 m to 10 m), D (for example, the error is 10 m or greater), and E (for example, unclear).

FIG. 4 is an explanatory figure showing examples of landmark images 357 in the landmark data group 122 held in the vehicle position estimation support server 10 according to this first embodiment of the present invention. In concrete terms, FIG. 4 is a figure showing examples of landmark images of the landmarks 7100, 7110, and 7111 of FIG. 2, and these images respectively corresponding to the images 8100-1 and 8100-2, the image 8110-1, and the image 8111-1 in FIG. 3. It should be understood that while, in FIG. 4, images in which the edge portions (i.e. the outline portions) of the landmarks have been extracted are used as examples of landmark images, it would also be acceptable to employ photographic images of those landmarks, or to use images in which characteristic points have been extracted by some predetermined method.

The image 8100-1 and the image 8100-2 are landmark images for the same landmark 7100. However, since the azimuths of progression along the roads specified by the road link (7001, 7002) and by the road link (7002, 7003) are different, accordingly the views are different from one another, although they are views of the same landmark. For the road link (7002, 7003), the image that can be recognized by the camera device group 50 of the vehicle 2 becomes a circular landmark image like the image 8100-2, since the vehicle 2 is traveling forward straight toward the landmark 7100. On the other hand, for the road link (7001, 7002), the image that can be recognized by the camera device group 50 of the vehicle 2 becomes an elliptical landmark image that is compressed horizontally like the image 8100-1, since the vehicle 2 is traveling in a slanting direction 7100 relative to the landmark. In this manner, the shape of the landmark that can be recognized by the camera device group 50 of the vehicle 2 changes according to the azimuth of travel of the vehicle 2 with respect to that landmark (not only in the horizontal direction, but also in the vertical direction, for example when the vehicle is traveling upon an inclined road). Due to this, if the way in which the landmark appears changes according to the location as is the case for the landmark 7100 in FIG. 3, then the subject recognition range 356 is defined as being divided into a plurality of sections, and, for each of these position range sections, it is desirable to designate a landmark image 357 reflecting a shape of the landmark that is easy to recognize. It should be understood that while, here, an example is shown of a case in which different landmark images 357 are designated according to the subject recognition range, arrangements of a similar type could be made for a case in which the way that the landmark looks is different according to differences in the environment 355.

The image 8110-1 and the image 8111-1 are landmark images for the landmarks 7110 and 7111 which are painted upon the road surface. In this example, by contrast to the fact that the image 8110-1 has preserved the prescribed shape of its landmark, in the image 8111-1 a portion is missing from the prescribed shape. This shows that, in this example, a corresponding portion of the paint upon the actual road surface has been rubbed down and become thinner, so that it has become impossible to recognize it as being a painted portion. Thus, a landmark is not limited to having been maintained in its initial state when it was installed; it often happens that, due to the adherence of dirt or due to deformation, the characteristics of the landmark that can be actually recognized from the onboard camera are different from those of the originally stipulated landmark.

In this embodiment, the vehicle position estimation support server 10 gathers images of those landmarks that have actually been photographed by camera device groups 50 of vehicles 2, or those landmark images, and, since each of the landmark images is generated based on those gathered images, accordingly it is possible to provide landmark images in which the actual states of the landmarks are reflected. Due to this it is possible to enhance the recognition ratio, as compared to the case of landmark recognition in which only landmark images having their originally stipulated shapes are employed.

An example of the data structure of the landmark information data group 213 of the vehicle 2 will now be explained with reference to FIG. 5. FIG. 5 is a figure showing an example of information that is included in the landmark information data group 213 when the vehicle 2 travels through the position 7500 in the upward direction in FIG. 2.

The data items 371 through 379 are respectively the same as 351 through 359 of the landmark data group 122 of the vehicle position estimation support server 10.

In FIG. 5, the landmark information data group 213 of the vehicle 2 includes landmark information for landmarks upon the estimated travel path of the vehicle. For example, if it is estimated that the vehicle 2 will proceed straight ahead along the road from the position 7500, then landmark information relating to this trajectory will consist of the landmarks 7100, 7101, 7110, 7111, 7120, 7130, 7140 and so on. While, for example, the data related to all of the traffic lights 7140 through 7143 of the node 7004 (i.e. of the intersection 7004) is included in the landmark data group 122 of the vehicle position estimation support server 10, the only traffic light that is considered to have any relationship with the vehicle 2 as it travels from below in FIG. 2 is 7140. Due to this, only the traffic light 7140 is included in the landmark information data group 213 of the vehicle 2 in FIG. 5. Moreover, depending upon the current environment of the vehicle 2, the landmark information that is stored in the landmark information data group 213 may be limited; for example, in FIG. 5, since the vehicle 2 is traveling in the day-time, accordingly a format is employed in which only information for which the environment 375 is day-time is stored.

Even further, it would also be acceptable to arrange to eliminate, from the landmark information that relates to the vehicle 2, portions that are considered to be unnecessary. For example, although the stop line 7120 is included as one item of landmark information that is relevant in the landmark data group 122 of the vehicle position estimation support server 10 of FIG. 3, since its recognition evaluation value is low (for example, is lower than some predetermined, value), accordingly this stop line can also be eliminated from the subjects that are distributed from the vehicle position estimation support server 10. Due to this, in the example of FIG. 5, the landmark information for the stop line 7120 is not included in the landmark information data group 213 of the vehicle 2.

However, the landmark information that is stored in the landmark information data group 213 is not to be considered as being limited to the format described above. For example, it would also be possible for all the landmark information around the vehicle 2 to be included, as it is in the landmark data group 122 of the vehicle position estimation support server 10; or it would also be possible for all of the landmark information for some region or some country to be included.

Next, the operation of this vehicle position estimation system 1 will be explained.

As main processing, the onboard control device 20 of the vehicle position estimation system 1 executes: road map data acquisition processing, in which road map data for the surroundings of the vehicle 2 is acquired; landmark data acquisition processing, in which landmark data upon the estimated travel path of the vehicle 2 is acquired; landmark recognition processing in which, using the above landmark data that has thus been acquired, landmarks are recognized in the images from the onboard camera; subject vehicle position estimation processing, in which the position of the subject vehicle upon the road map is estimated; and evaluation result transmission processing, in which the evaluation results related to landmark recognition are transmitted to the vehicle position estimation support server 2. Each of these processes will now be explained in order.

Figure 6:
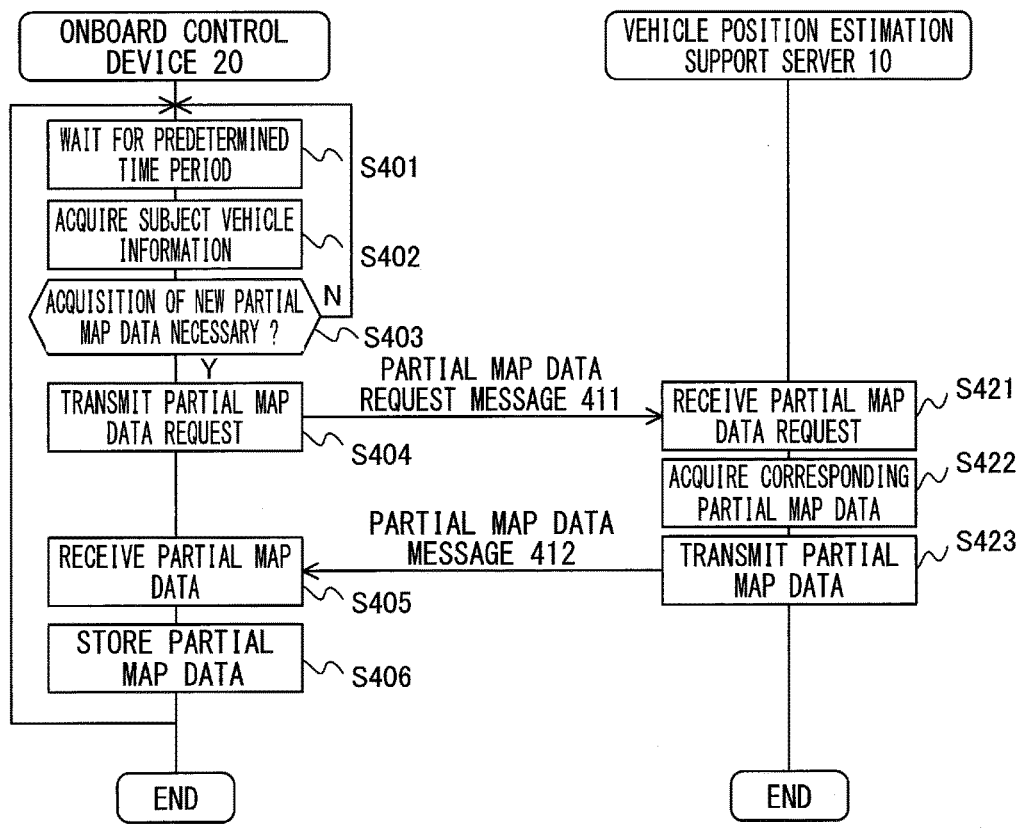
FIG. 6 shows a flow of road map data acquisition processing executed by the vehicle travel control system according to the first embodiment of the present invention.

FIG. 6 shows the flow 400 of road map data processing executed by this vehicle position estimation system 1 according to the first embodiment of the present invention.

First, after having waited for a predetermined time period (step (S)401), the road map data management unit 201 of the onboard control device 20 acquires subject vehicle information from the subject vehicle information data group 222 (step 402). This wait for the predetermined time period is waiting for a time period until road map data acquisition is triggered. Road map data acquisition could be triggered upon a timer so that acquisition is implemented at fixed time intervals, or triggering could be performed on demand when the necessity of updating the road map data is detected. The subject vehicle information that is acquired in step 402 includes, for example, position information and travel information for the vehicle 2. The position information for the vehicle 2 may be latitude and longitude, like the information acquired from the subject vehicle position measurement device 40, or may also be position information upon the road map for the road link or the like upon which the vehicle 2 is present; any format will be acceptable, provided that it enables knowledge of the rough position of the vehicle upon the road map. And the travel information for the vehicle 2 may, for example, be the azimuth in which it is progressing, or its direction of progression along a road.

Next in step 403, using the subject vehicle information acquired in step 402, a check is made as to whether or not it is necessary to acquire new partial map data. Generally, road map data is managed by being divided into units called "parcels". A parcel is, for example, a single demarcated portion (for example a 2.5 km square) when some region is subdivided by a square mesh. In step 403, for example, partial map data may be acquired in units of parcels. In this case, the parcel position of the vehicle 2 and the probability that the vehicle may shift to a different parcel are forecast from the position information and the travel information for the vehicle 2 that were acquired in step 402, and a check is made as to whether or not the onboard control device 20 holds the parcel groups that are required, including those that may be required in the near future. If the onboard control device 20 is holding all the parcel groups that may be required, then the flow of control returns to step 401. On the other hand, if in step 403 some parcel group that may be required is found to be missing, then the flow of control proceeds to step 404.

In step 404, the road map data management unit 201 generates a partial map data request message 411 on the basis of the partial map data that was specified in step 403, and transmits this message that has thus been generated to the vehicle position estimation support server 10.

Figure 7:
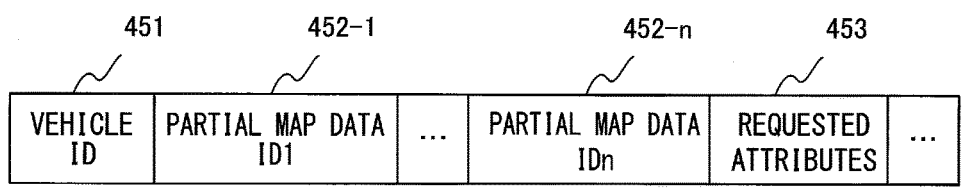
FIG. 7 is an explanatory figure showing an example of the format of a partial map data request message transmitted by the onboard control device according to the first embodiment of the present invention.

FIG. 7 is an explanatory figure showing an example of the format 450 of a partial map data request message 411 transmitted by the onboard control device 20 according to the first embodiment of the present invention. However, header information related to the communication protocol and so on is omitted from this figure.

The partial map data request message 411 includes a vehicle ID 451, a list 452-1 through 452-n of partial map data IDs, requested attributes 453, and so on. It should be understood that it would be acceptable for the various types of information described above to be transmitted as a single message, as in the partial map data request message format 450 shown in the figure; or, alternatively, it would be acceptable for this information to be divided into any desired plurality of messages and then transmitted.

The vehicle ID 451 is an identifier for the vehicle 2, and is a data item for enabling the vehicle 2 to be uniquely identified by the vehicle position estimation support server 10. The partial map data ID 452 is an identifier that specifies the partial map data that it is necessary to acquire, as specified in step 403. For example, if the partial map data is acquired in units of parcels, then this identifier will correspond to the parcel ID. And the requested attributes 453 are, for example, attribute information related to the partial map data that it is desired to acquire, and are used for specification of the map attributes to be acquired and so on.

We now return to the explanation of the road map data acquisition processing flow 400 (FIG. 6). The data request reception unit 101 of the vehicle position estimation support server 10 receives, via the network 4, the partial map data request message 411 that was transmitted in step 404 from the road map data management unit 201 of the onboard control device 20 (step 421). Although this detail is not described in the figure, it should be understood that, when the data request reception unit 101 receives the partial map data request message 411, it analyzes that message according to its format 450 and extracts data items of various types.

Next in step 422, on the basis of the partial map data ID that has been extracted in step 421, the road map data transmission unit 102 acquires the corresponding partial map data from the road map data group 121. And the road map data transmission unit 102 generates a partial map data message 412 on the basis of the partial map data that has thus been acquired, and transmits this message that it has generated to the onboard control device 20 of the vehicle 2 that was the original source of transmission of the partial map data request message (step 423). The partial map data message 412 is built up by extracting the required information from the partial map data that has been acquired according to the requested attributes 453 of the partial map data request message 411 and so on: for example, information such as the network structure of roads in the corresponding map area, their attributes, their shapes, their landmarks, and so on may be included therein.

And when, in step 405, the road map data management unit 201 of the onboard control device 20 receives the partial map data message 412 (it will be supposed that, in a similar manner to the case in step 421 described above, this includes analysis and extraction of data of various types in the message), then the partial map data that has been received is stored in the road map data group 221 in step 406.

According to the above, a single cycle of the road map data acquisition processing flow 400 is completed, and the flow of control returns back to step 401 again, so that similar processing is repeatedly executed.

In this manner, the road map data management unit 201 acquires the partial map data that is required according to the position and the running state of the vehicle 2, and thus manages the road map data group 221. Although this is not described in the figure, it should be understood that the road map data management unit 201 also fulfils the role of deleting partial map data that has become unnecessary from the road map data group 221. In this process, in a similar manner to the case for partial data map acquisition, a decision is made according to the position and the running state of the vehicle 2 as to whether or not keeping some predetermined map area is unnecessary, and if it is decided that this map area is not required, then the corresponding partial map data is deleted from the road map data group 221. By doing this, it becomes possible to keep the amount of space in the storage unit 220 consumed by the road map data group 221 down to a manageable constant amount.

Furthermore, while in this embodiment the partial road map data is acquired from the vehicle position estimation support server 10, the source for acquisition of the partial road map data is not to be considered as being limited to being the server 10; it would be acceptable for the partial road map data 311 to be distributed from a roadside unit 3 and to be acquired via the wireless communication device 30, so as to be reflected in the road map data group 221; or a method would also be acceptable in which road map data is acquired from a path finding device (not shown in the figures) such as a navigation device or the like that is connected to the onboard network of the vehicle 2, or from a device that stores road map data such as a smart phone or the like (also not shown in the figures).

Figure 8:
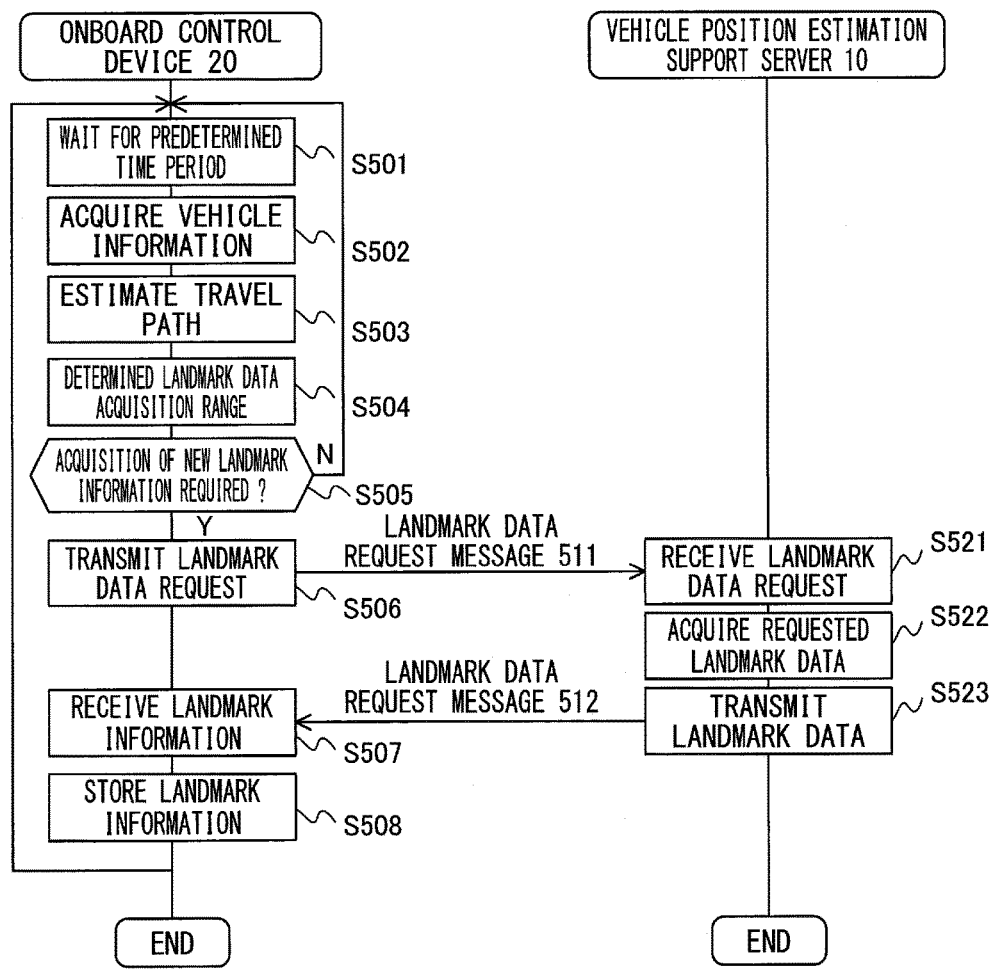
FIG. 8 shows a flow of landmark data acquisition processing executed by the vehicle travel control system according to the first embodiment of the present invention.

FIG. 8 shows the flow 500 of landmark data acquisition processing executed by the onboard control device 20 according to the first embodiment of the present invention.

First, after having waited for a predetermined time period (step 501), the landmark data management unit 202 of the onboard control device 20 acquires the subject vehicle information from the subject vehicle information data group 222 (step 502). This wait for the predetermined time period is waiting for a time period until road map data acquisition is triggered. The subject vehicle information that is acquired in step 502 may include, for example, position information, travel information, path information, and so on for the vehicle 2, and is information for estimating the travel path of the vehicle 2. The path information for the vehicle 2 may, for example, be information that is acquired from a path finding device such as a navigation device that is connected to the onboard network of the vehicle 2, a smart phone or the like (not shown in the figures).

Next, on the basis of the vehicle information acquired in step 502, the landmark data management unit 202 estimates the travel path (step 503). The travel path could be estimated by using the path information and so on of this vehicle 2, or, if this cannot be employed, then it would also be acceptable to estimate the travel path on the basis of the hypothesis that the vehicle will continue to travel straight along the road upon which it is traveling at present. Moreover, it is not necessary for only one travel path to be considered; it would also be possible to extract a plurality of paths for which the possibility that the vehicle will travel along them is high, and to take these as being travel paths; or, it would also be possible to consider all of the paths that the vehicle can travel along within some fixed range of running distance as being travel paths.

The landmark data management unit 202 compares together the travel path that has been estimated in step 503 and the road ranges of the landmark data that has already been acquired, and determines one or more road ranges of landmark data that are to be acquired (step 504). Here, the road ranges of landmark data may be, for example, considered in units of road links in the road map data, or in units of aggregations thereof. In this case, the abovementioned road range of landmark data that has already been acquired means an aggregation of road links for which landmark data has already been acquired from the vehicle position estimation support server 10, and, among the aggregates of road links (for example, road links within some constant running distance range) upon the travel path estimated in step 503 that satisfy some predetermined condition, those that are not included in the abovementioned road ranges of landmark data that has already been acquired become road ranges of landmark data that are to be acquired. Furthermore it would also be acceptable, for example, to determine the road ranges of landmark data in units of area that are demarcated by subdividing the road map data with a square mesh or the like, or in aggregates thereof. In this case, the abovementioned road range of landmark data that has already been acquired will mean landmark data for an aggregate of demarcated areas that has already been acquired from the vehicle position estimation support server 10, and, among the aggregates of demarcated areas through which road links that satisfy some predetermined condition upon the travel path estimated in step 503 pass, those that are not included in the abovementioned road ranges of landmark data that have already been acquired become road ranges of landmark data that are to be acquired.

If the landmark data acquisition range determined in step 504 is the empty set, then, since it is not necessary to acquire any new landmark information, accordingly the landmark data management unit 202 returns the flow of control back to step 501 (NO in step 505). On the other hand, if some landmark data acquisition range is present in the determined range, then the landmark data management unit 202 transfers the flow of control to step 506 (YES in step 505).

The landmark data management unit 202 generates a landmark data request message on the basis of the landmark data acquisition range that has been determined in step 504, and transmits this message that has thus been generated to the vehicle position estimation support server 10 (step 506).

Figure 9:
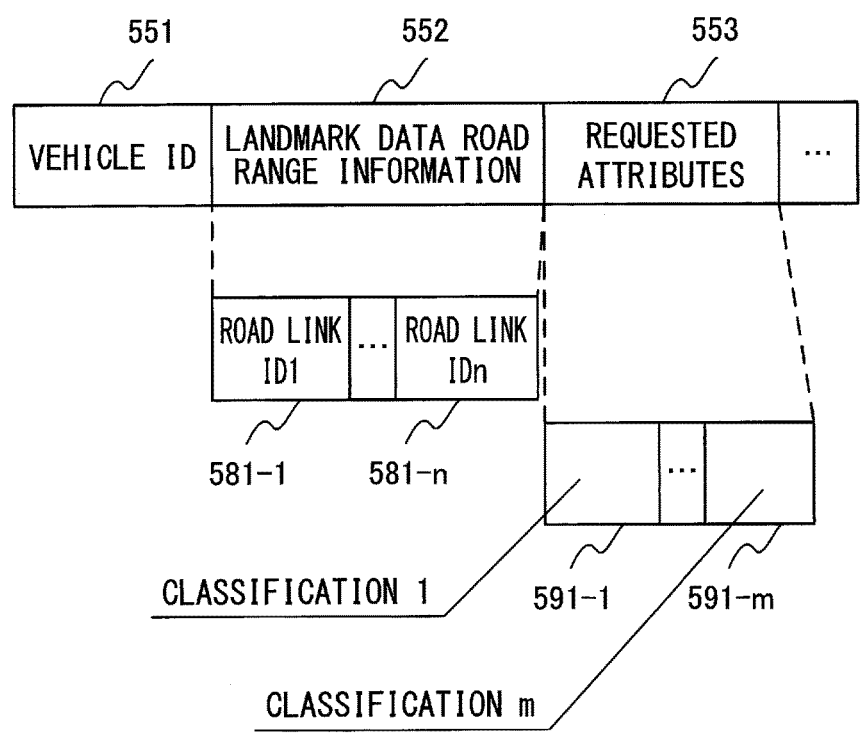
FIG. 9 is an explanatory figure showing an example of the format of a landmark data request message transmitted by the onboard control device according to the first embodiment of the present invention.

FIG. 9 is an explanatory figure showing an example of the format 550 of a landmark data request message 511 transmitted by the onboard control device 20 according to the first embodiment of the present invention. However, header information related to the communication protocol and so on is omitted from this figure.

This landmark data request message 511 includes a vehicle ID 551, landmark data road range information 552, requested attributes 553, and so on. It should be understood that it would be acceptable for the various types of information described above to be transmitted as a single message, as in the landmark data request message format 550 shown in the figure; or, alternatively, it would be acceptable for them to be divided into any desired plurality of messages and then transmitted.

The vehicle ID 551 is an identifier for the vehicle 2, and is a data item for enabling the vehicle 2 to be uniquely identified by the vehicle position estimation support server 10. The landmark data road range information 552 corresponds to the road range that was specified by the onboard control device 20 in step 504, and for which it is necessary to acquire landmark data. For example, if the landmark data road ranges are expressed as aggregates of road links, then one or more road link IDs (581-1 through 581-*n*) will be included in the landmark data road range information 552. On the other hand, if the landmark data road ranges are expressed as aggregates of road areas, then one or more road area IDs will be included in the landmark data road range information 552. And the requested attributes 553 are attribute information related to the landmark data that it is desired to acquire. For example, it would be possible to include a list (591-1 through 591-m) of landmark classifications (traffic signs, traffic lights, painted road marks, buildings, or the like) that are to be subjects of acquisition. Moreover, for example, by appending environmental conditions (brightness, weather, or the like) and/or recognition evaluation values or the like to the requested attributes, it would also be possible to make it possible for only landmark information that is related to a specified environment 355 or to a specified evaluation value 358 in FIG. 3 to be designated; and it would also be possible to attach an upper limit value to the number of landmarks to be acquired, and to select landmarks upon a predetermined scale of priority order of recognition evaluation values 358 or the like.

We now return to the explanation of the landmark data acquisition processing flow 500 (FIG. 8). In step 521, the data request reception unit 101 of the vehicle position estimation support server 10 receives, via the network 4, the landmark data request message 511 that was transmitted by the onboard control device 20. Although this is not shown in the figures, it should be understood that, upon receipt of the landmark data request message 511, the data request reception unit 101 analyzes it and extracts data of various types, according to its format 550.

Next in step 522, on the basis of the landmark data road range information 552 and the requested attributes 553 that were extracted in step 521, the landmark data transmission unit 103 acquires the corresponding landmark data from the landmark data group 122. And, on the basis of this landmark data that has thus been acquired, the landmark data transmission unit 103 generates a landmark data message 512, and transmits this message that it has generated to the onboard control device 20 of the vehicle 2 that was the original source of sending the landmark data request message 511 (step 523).

Figure 10:
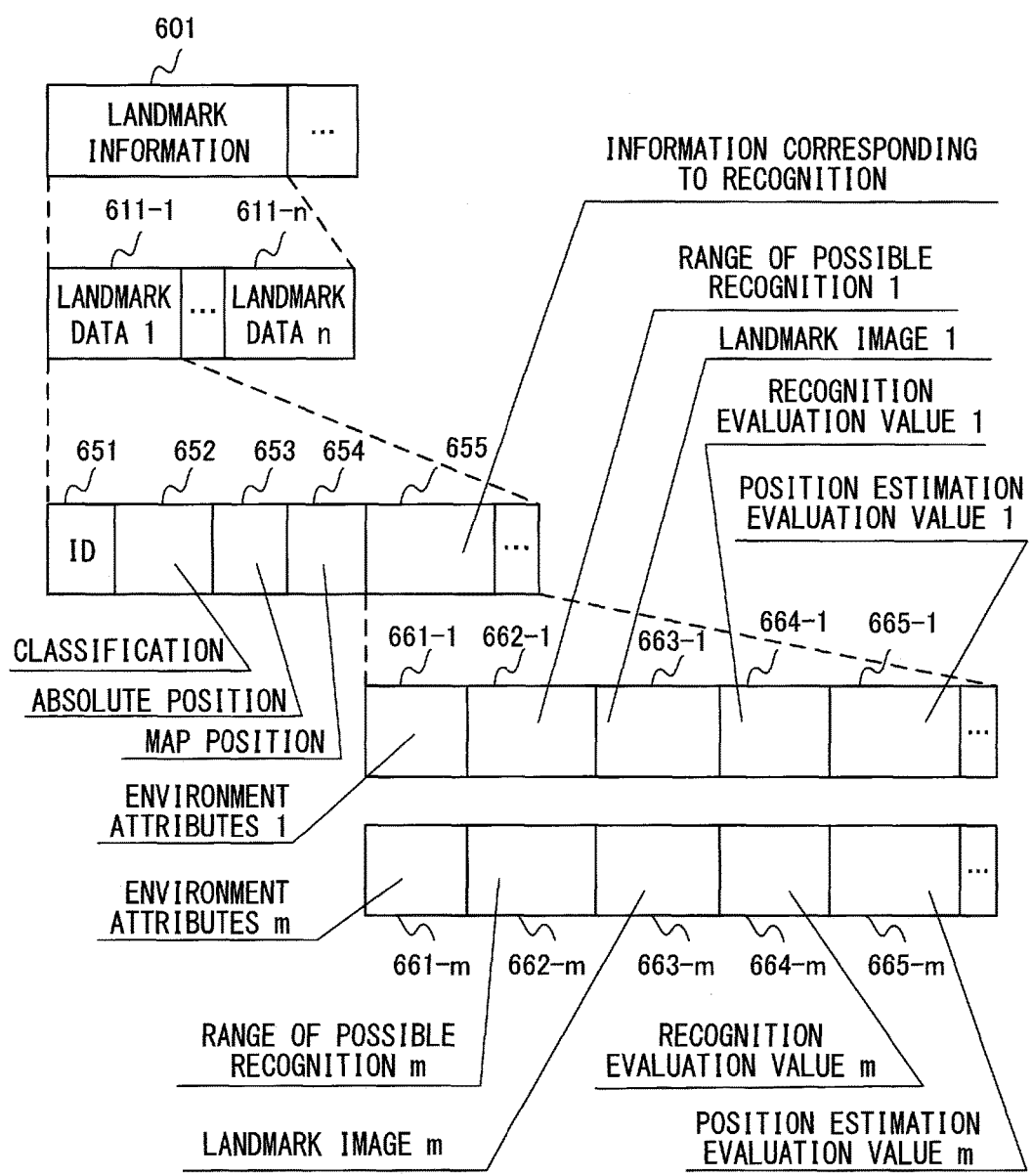
FIG. 10 is an explanatory figure showing an example of the format of a landmark data message transmitted by the vehicle position estimation support server according to the first embodiment of the present invention.

FIG. 10 is an explanatory figure showing an example of the format 600 of a landmark data message 512 that is transmitted by the vehicle position estimation support server 10 according to the first embodiment of the present invention. However, header information related to the communication protocol and so on is omitted from this figure.

This landmark data request message 512 includes landmark information 601, information 602 corresponding to position estimation, and so on. It should be understood that it would be acceptable for the various types of information described above to be transmitted as a single message, as in the landmark data request message format 600 shown in the figure; or, alternatively, it would be acceptable for this information to be divided into any desired plurality of messages and then transmitted.

The landmark information 601 is an aggregate (611-1 through 611-n) of landmark data 611 that has been extracted according to the landmark data request of the onboard control device 20. For example, a landmark ID 651, a landmark classification 652, an absolute position 653, a map position 654, information corresponding to recognition 655, and so on may be included in such landmark data 611.

The landmark ID 651 is the identifier of the landmark. This landmark ID 651, for example, may be used for establishing correspondence between landmark information included in the road map data group 221 or a recognition result for that landmark or the like, and other information.

The landmark classification 652 is an identifier for recognizing the classification of the landmark such as a traffic sign, a traffic signal, a stop line, or the like, and corresponds to the landmark classification 352 of the landmark data group 122.

The absolute position 653 is position information for the landmark expressed in a global coordinate system, such as latitude, longitude, and height or the like. By contrast, the map position 654 specifies the identifier of a road object such as the road link or the road node or the like where this landmark is present and the position of the landmark within that road object, and corresponds to the corresponding road 353 and to the position information 354 of the landmark data group 122.

The information corresponding to recognition 655 is data corresponding to recognition of this landmark, and consists of one data entry or more. The data entries in the information corresponding to recognition 655 correspond to an environment attribute 661, a range of possible recognition 662, a landmark image 663, a recognition evaluation value 664, a position estimation evaluation value 665, and so on; and these respectively correspond to the environment 355, the subject recognition range 356, the landmark image 357, the recognition evaluation value 358, and the position estimation evaluation value 359 of the landmark data group 122.

We now return to the explanation of the landmark data acquisition processing flow 500 (FIG. 8). The landmark data management unit 202 of the onboard control device 20 receives via the network 4 the landmark data message 512 that was transmitted in step 507 from the vehicle position estimation support server 10 (as in the case of step 521 described above, it will be supposed that this includes analysis and extraction of data of various types within the message), and, in step 508, stores the landmark data that has thus been received in the landmark data group 223.

According to the above, a single cycle of the landmark data acquisition processing flow 500 is completed, and the flow of control returns back to step 501 again, so that similar processing is repeatedly executed.

In this manner, on the basis of the position, the running state, the path information, and so on of the vehicle 2, the landmark data management unit 202 acquires from the vehicle position estimation support server 10 landmark data that may be necessary in the near future, and thereby manages the landmark data group 223. Although this is not described in the figure, it should be understood that the landmark data management unit 202 also fulfils the role of deleting landmark data that has become unnecessary from the landmark data group 223. In this process, in a similar manner to the case for landmark data acquisition, a decision is made according to the position and the running state of the vehicle 2 and its path information, as to whether or not keeping some predetermined landmark data is unnecessary, and if it is decided that this landmark data is not required, then this landmark data is deleted from the landmark data group 223. By doing this, it becomes possible to keep the region in the storage unit 220 consumed by the landmark data group 223 down to a constant amount.

Figure 11:
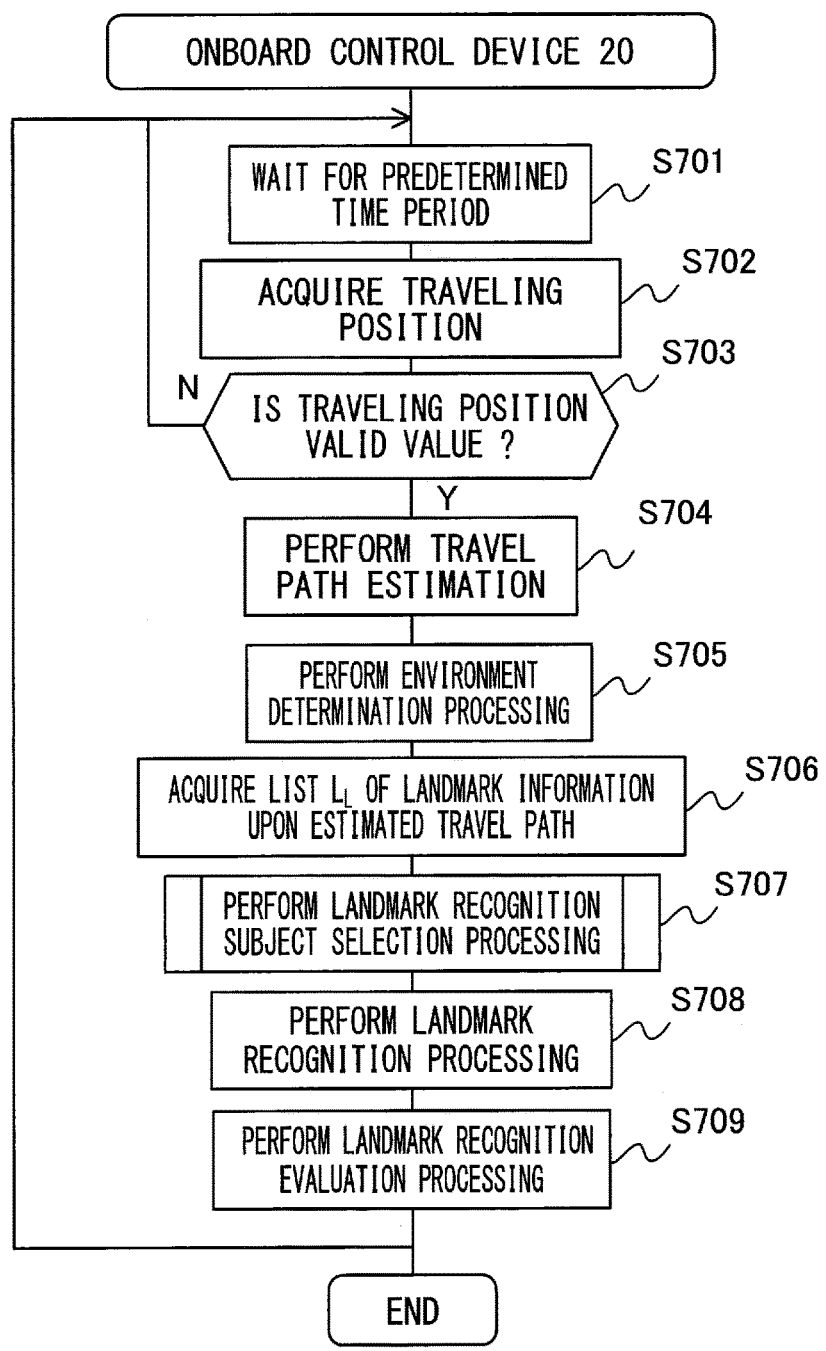
FIG. 11 shows a flow of landmark recognition processing executed by the onboard control device according to the first embodiment of the present invention.

FIG. 11 shows the flow 700 of the landmark recognition processing that is executed by the onboard control device 20 according to the first embodiment of the present invention.

First, after having waited for a predetermined time period (step 701), the landmark recognition unit 204 of the onboard control device 20 acquires the traveling position information of the subject vehicle from the subject vehicle information data group 222 (step 702). The traveling position information that is acquired in step 702 is information that specifies the position upon the road map upon which the vehicle 2 is traveling, and, for example, may be the road link ID of the road along which the vehicle is traveling and the offset position of the vehicle 2 along that road link. The traveling position information is specified by a subject vehicle position estimation processing flow as will be described hereinafter, and is stored in the subject vehicle information data group 222. However, in some cases it is not possible for the traveling position to be specified because the subject vehicle position measurement device 40 cannot find the GNSS satellites or the like, and in such a case the flow of control returns to step 701 (NO in step 703). But if the traveling position is specified normally, then the flow of control proceeds to the next step 704 (YES in step 703).

Next, the landmark recognition unit 204 estimates the travel path of the vehicle 2 from the traveling position specified in step 702 and/or from other subject vehicle information (travel information, path information, and so on) (step 704). This estimation of the travel path is processing that is the same as that of step 503 in the landmark data acquisition processing flow 500. However, since the objective of the landmark data acquisition processing flow 500 is to store in advance in the landmark data group 223 data for landmarks upon roads upon which there is a possibility that the vehicle will travel in the near future, accordingly that processing flow needs to take a somewhat wider range as subject, whereas in the case of this processing flow it is sufficient to estimate the travel path over a comparatively short distance range (for example around a few hundreds of meters), since the objective is to extract landmarks that are present in the vicinity of the path along which the vehicle is traveling.

Furthermore, in step 705, the landmark recognition unit 204 performs processing in order to determine the environment in which the vehicle is traveling. In concrete terms, it recognizes the surrounding brightness or the surrounding weather. The surrounding brightness may, for example, be determined by analyzing the luminance of the image data acquired by the camera device group 50, or could be determined by acquiring the state of a lighting device of the vehicle 2 (that can be acquired from the sensor group 60), or could be determined from date and time information acquired from an internal clock of the onboard control device 20 or from the exterior, or could be determined from any desired combination of the above. Moreover, for example, the surrounding weather could be estimated by analyzing the image data acquired by the camera device group 50 and determining poor visibility from the relationship between the distance of an object in front of the vehicle and its appearance, or could be determined as being the state of raining or snowing by the state of a windshield wiper device of the vehicle 2 (which could be acquired from the sensor group 60); or the surrounding weather could be determined on the basis of surrounding weather information acquired from one of the roadside units 3 or from another system (not shown in the figure) that distributes local weather information, or could be determined from any desired combination of the above.

And, on the basis of the travel path estimated in step 704 and the environment information determined in step 705, the landmark recognition unit 204 extracts from the landmark data group 223 a list of the landmarks that it is supposed may perhaps be recognized by the camera device group 50 of the vehicle 2, or that may perhaps be recognized in the near future.

Care must be exerted to ensure that there is a possibility for all of the landmarks that are present upon the estimated travel path to be included in the list of landmark data extracted in step 706. Since the onboard control device 20 is required to operate at high reliability in the severe environment of a vehicle, accordingly generally, for such a device, a product is used whose performance (CPU performance, memory performance, and so on) is low as compared to the performance of a general purpose device. Landmark recognition may, for example, be implemented by performing pattern matching of images of supposed landmarks (i.e. templates) with camera images. The computational complexity required by this type of processing is high, and moreover, the larger the image data is and the greater the number of landmarks (i.e. the number of templates) that are to be subjects for recognition becomes, the more is the processing load increased. Due to this, it is difficult to execute recognition processing for all of the landmarks upon the travel path with the performance of a typical onboard control device 20, so that it is necessary to be selective in choosing the landmarks to be subjects for recognition.

Thus, before performing landmark recognition processing, the landmark recognition unit 204 performs processing to select the landmarks that are to be the subjects for recognition (step 707).

Figure 12:
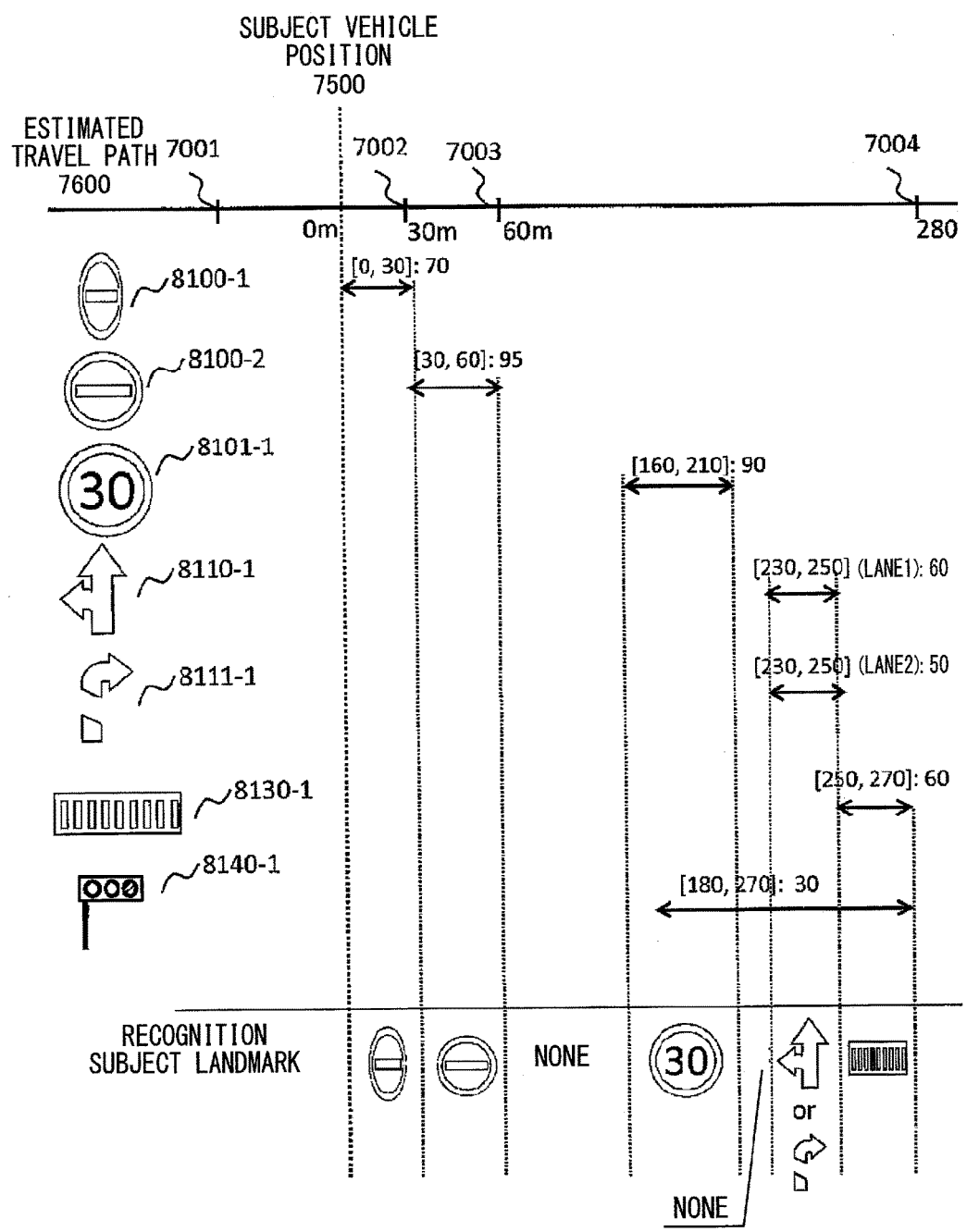
FIG. 12 is an explanatory figure showing an example of landmark recognition subject selection processing (during day-time) executed by the onboard control device according to the first embodiment of the present invention.
Figure 13:
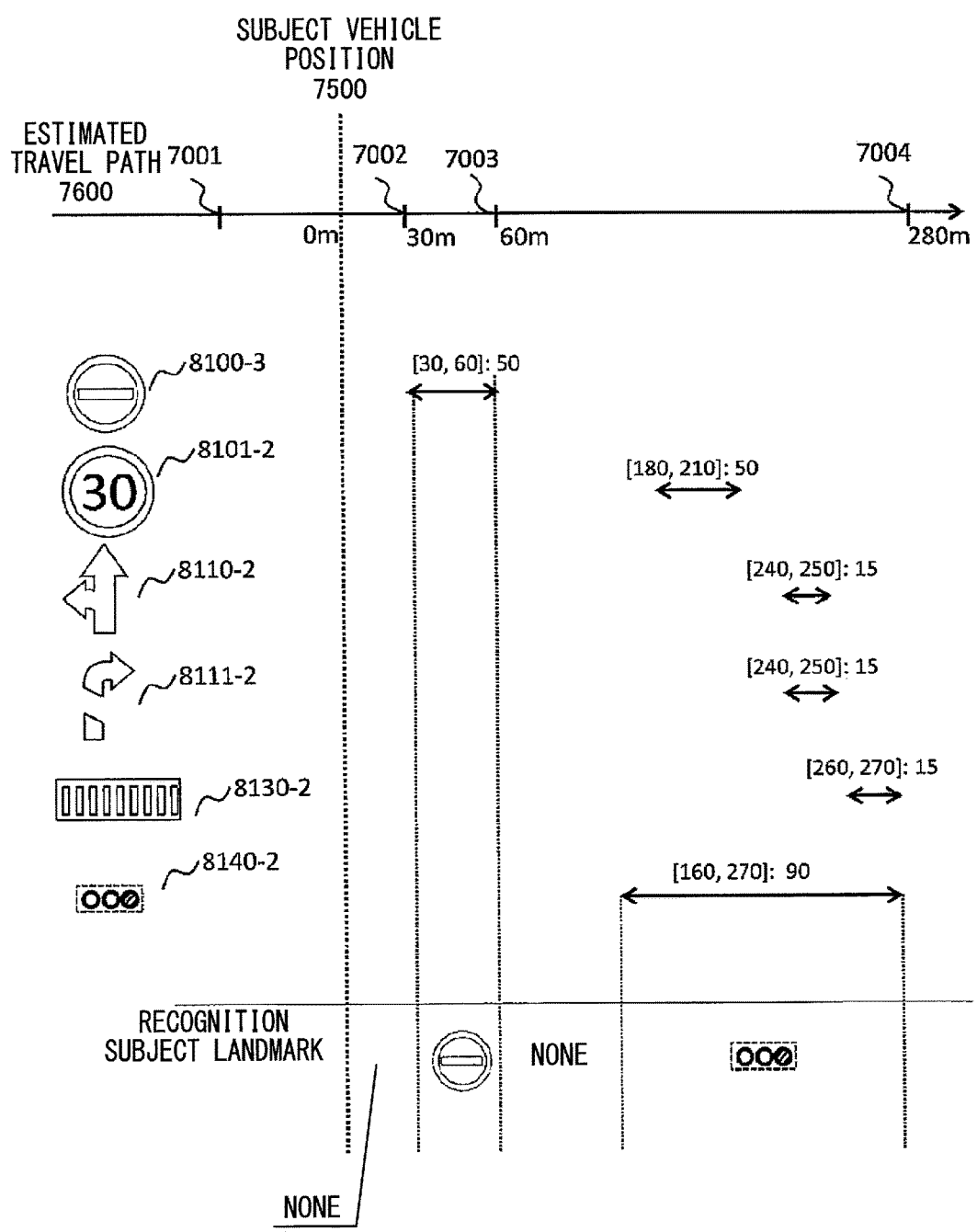
FIG. 13 is an explanatory figure showing an example of landmark recognition subject selection processing (during night-time) executed by the onboard control device according to the first embodiment of the present invention.

FIGS. 12 and 13 are figures schematically showing examples of this landmark recognition subject selection processing 707 executed by the onboard control device 20 according to the first embodiment of the present invention. FIG. 12 is an example of recognition subject selection processing 707 during the day-time, and FIG. 13 is an example of recognition subject selection processing 707 during the night-time.

The axes extending rightward in the upper parts of the figures are for displaying the estimated travel path of the vehicle in one dimension. Road nodes 7001 through 7004 and the position 7500 of the vehicle 2 are arranged upon the axis of the estimated travel path 7600 (corresponding to the environment of FIG. 2). The vehicle 2 is proceeding in the rightward direction along the axis of the travel path 7600, with the relative distances to each road node being as shown. For example, the distance to the road node 7002 is 30 m.

Landmark images of landmarks that are present upon the estimated travel path 7600 are arranged in the vertical direction on the left side in the figures, and, on the right side of each of these landmark images, the relationship between the range of possible recognition and the recognition evaluation value that apply to that landmark image and the estimated travel path is shown. For example, in FIG. 12, the range and the value that apply to the landmark image 8100-1 of the landmark 7100 are between a ground point 30 m before the road node 7002, and the road 7002. This is because that the subject recognition range of the landmark image 8100-1 of the landmark 7100 in FIG. 5 is at a position of the road link (7001, 7002) that is offset by 70 m to 100 m, and the road link (7001, 7002) is 100 m (although this is not explicitly described, it is supposed to be understood by referring to the road map data 221). In FIGS. 12 and 13, the ranges of possible recognition and the recognition evaluation values of the various landmark images are expressed in the format [x, y](w):z. x and y are the relative distances from the position of the vehicle 2 with respect to the starting ground point and the ending ground point of the range of possible recognition. And z is the recognition evaluation value of the corresponding landmark image. Moreover, w is a condition upon the road link under which it is possible to recognize that image (i.e. a condition for recognition to be possible). For example, "(lane 1)" is noted for the landmark image 8110-1, and this means that the landmark image 8110-1 can only be recognized during travel upon lane 1.

In the lower portions of the figures, the recognition subject landmarks that have been selected by the landmark recognition subject selection processing 707 are shown. While, in the examples of FIGS. 12 and 13, the number of recognition subject landmarks is taken as being one, it would also be acceptable for two or more to be selected.

First, the method of selection of landmark recognition subjects will be explained with reference to FIG. 12. Since the objective is to enhance the success ratio of landmark recognition, accordingly landmarks whose recognition evaluation values are high are selected as priority. Since there are no other candidates that are 0 to 30 m and 30 to 60 m from the subject vehicle position 7500 other than the landmark images 8100-1 and 8100-2, accordingly those are selected as recognition subject landmarks. On the other hand, a plurality of landmark images are overlapped at 180 to 270 m from the subject vehicle position 7500. Due to this, the landmark images for which the recognition evaluation values are high are selected as a priority; for example at 160 to 210 m the landmark image 8101-1 (whose recognition evaluation value 90 is greater than the recognition evaluation value 30 of the landmark image 8140-1) is selected, while at 250 to 270 m the landmark image 8130-1 (whose recognition evaluation value 60 is greater than the recognition evaluation value 30 of the landmark image 8140-1) is selected.

On the other hand, at 230 to 250 m from the subject vehicle position 7500, the conditions "(lane 1)" and "(lane 2)" for recognition to be possible are set for the landmark images 8110-1 and 8111-1, and, since this is an exclusive relationship, it is not the case that only the landmark image 8110-1 whose recognition evaluation value is the highest is selected; rather, both the landmark images 8110-1 and 8111-1 are taken as being recognition subject landmarks. However if, due to a performance problem with the onboard control device 20, only recognition processing for a single landmark is possible, then, in landmark recognition processing that will be described hereinafter, this is selected according to the running state. For example, if the lane position of the vehicle 2 can be specified or can be estimated (for example, by using winker information or the like), then a landmark image that can be recognized is selected according to the information of which lane the vehicle is in. But if it is completely impossible to estimate the lane position, then selection of a recognition evaluation value that is high or the like is performed, or one of the landmark images is selected according to a predetermined method.

Moreover it is also possible to eliminate a landmark from consideration as a recognition subject if its recognition evaluation value is lower than some predetermined value, even if, for example, there is no other candidate that can be selected. In FIG. 12, while only the landmark image 8140-1 is available as a recognition subject candidate at 210 to 230 m from the subject vehicle position 7500, it is not included as a recognition subject candidate, since its recognition evaluation value is 30 this is too low. Due to this, it becomes possible to prevent any bad influence with regard to position estimation processing due to a recognition error or due to mistaken recognition of a landmark.

The same holds for the processing of FIG. 13 during night-time as well. However, during night time, the landmarks that become candidates and their landmark images and also their subject recognition ranges and their evaluation values are different, since landmark data are acquired for when the environmental condition in the landmark data group 223 is night-time. Due to this there is a possibility that the landmarks that become subjects for recognition will change, as compared to the case during day-time, even if the estimated travel path is the same.

First, in FIG. 13, there is no landmark image corresponding to 8100-1 in FIG. 12. This is because, since it is dark at night-time, accordingly it becomes impossible to recognize landmarks that are comparatively far away from the vehicle 2. Next, when the recognition evaluation values of the landmark image candidates at 160 to 270 m from the vehicle position 7500 are considered, it will be understood that they are opposite from those in FIG. 12. By contrast to the fact that the recognition evaluation value of the landmark image 8140-2 of a traffic light has risen to 90, the recognition evaluation values of the other landmark images have dropped to 15 to 50. This is because it is difficult to recognize landmarks since the surroundings are dark. By contrast, since a traffic light emits light, accordingly during the night-time it becomes easily visible from far away. In this manner, it is necessary to change the landmark images that are employed for recognition, according to the environmental conditions in which the vehicle 2 is traveling. For example, for the landmark image of the traffic light 7140, by contrast to the fact that during the day-time the shape of a traffic light (8140-1) is distinctive, during the night-time the light-emitting portion of a traffic light becomes distinctive (8140-2). Although with other landmark images the fact does not appear so clearly, it should be understood that the landmarks that are recognized during the night-time may well be different landmarks from those recognized during the day-time, since during the night time landmarks are recognized while they are being illuminated with the light.

We now return to the explanation of the landmark recognition processing flow 700 (FIG. 11). The landmark recognition unit 204 of the onboard control device 20 performs processing to recognize the landmark selected in step 707 from the image data that the camera image data acquisition unit 203 has acquired from the camera device group 50. It should be understood that while, here, it is supposed that the camera image data acquisition unit 203 periodically acquires image data from the camera device group 50 in parallel with the flow 700 of landmark recognition processing, it would also be acceptable to execute this acquisition during the landmark recognition processing flow 700, before step 708.

In concrete terms, in the landmark recognition processing of step 708, pattern matching processing is performed using the landmark images of the landmarks that have been selected in step 707, by scanning the abovementioned image data. The degree of agreement between the matching location and the landmark image is calculated, and, if the degree of agreement is greater than a predetermined value, then it is determined that this landmark is present at the matching location. At this time, the relative distance from the vehicle 2 to this landmark and its relative direction and so on are also calculated by using the matching location, the size of the landmark upon its image, the parallax from a plurality of camera elements (as, for example, in the case of a stereo camera), the differential values in time series, and so on. If the landmark is recognized, then these results are stored in the landmark recognition data group 224.

When the landmark recognition processing of step 708 is completed, next the landmark recognition result evaluation unit 205 performs processing to evaluate the recognition results for this subject landmark (step 709). This evaluation of the landmark recognition result is performed by checking whether or not it was possible to recognize the corresponding landmark within the subject recognition range that was specified. For example, a landmark that it has been possible to recognize is evaluated as having been successfully recognized. On the other hand, in relation to a landmark that cannot be recognized, there is a possibility that, at the time point that the execution of the landmark recognition processing of step 708 was completed, the vehicle had not yet arrived at the subject recognition range of that landmark, or had not passed it. Due to this, the system refers to the traveling position of the vehicle 2 (more accurately, to the traveling position at the time point that execution of the landmark recognition processing was completed) and checks whether or not the vehicle had passed through the subject recognition range of that landmark, and evaluates the situation as a recognition failure if it is possible to decide sufficiently reliably that the vehicle had indeed thus passed through. For example, in FIG. 12, even if it has not been possible to recognize the landmark image 8100-2 at the 50 m ground point, this is not yet evaluated as being a recognition failure; but rather, confirmation that it has not been possible to recognize the landmark image 8100-2 even at the 80 m ground point is evaluated as being a recognition failure for the first time. It should be understood that it is not possible to determine the subject recognition range precisely, since there is always some error included in the estimation of the traveling position, and therefore it is desirable to reserve the decision until, even including error, it is possible to determine sufficiently surely that the vehicle has definitely passed through the subject recognition range. A landmark whose evaluation has been reserved in this processing cycle comes to be finally evaluated in a subsequent processing cycle. If a different route is taken partway along the travel path that was estimated, then landmarks that are considered not to have actually been passed are not evaluated.

While, in the above description, an evaluation of successful recognition is made if it has been possible to recognize the landmark in question within the subject recognition range that has been designated, if for example objects that are considered to correspond to that landmark are detected at a plurality of locations within the same subject recognition range, which is undesirable, then this is evaluated as being a recognition failure. If a plurality of recognition locations for the landmark in question are found within the subject recognition range, then it is difficult to decide which spot corresponds to which landmark, and there is a possibility of arriving at an erroneous recognition result. If position estimation is performed using this kind of recognition result, then there is a risk that a large error may occur. Due to this, it is considered to be desirable to evaluate the recognition process as having failed, if it is not possible to identify the landmark in question in a reliable manner.

It should be understood that, in this evaluation of the result of landmark recognition, it would be acceptable, as described in the above explanation, to arrange to determine whether or not it has been possible to perform recognition according to two levels; or alternatively it would also be acceptable to classify the evaluations into a plurality of levels if recognition has been possible. For example, it would be possible to determine a plurality of levels of recognition by using the degree of agreement in pattern matching of the landmark image of the landmark or the like, or by using an indicator that specifies the likelihood of recognition.

The various results of the landmark evaluation processing in step 709 are stored in the landmark recognition data group 224.

According to the above, a single cycle of the landmark recognition processing flow 700 is completed, and then the flow of control returns back to step 701 again, so that similar processing is repeatedly executed.

Figure 14:
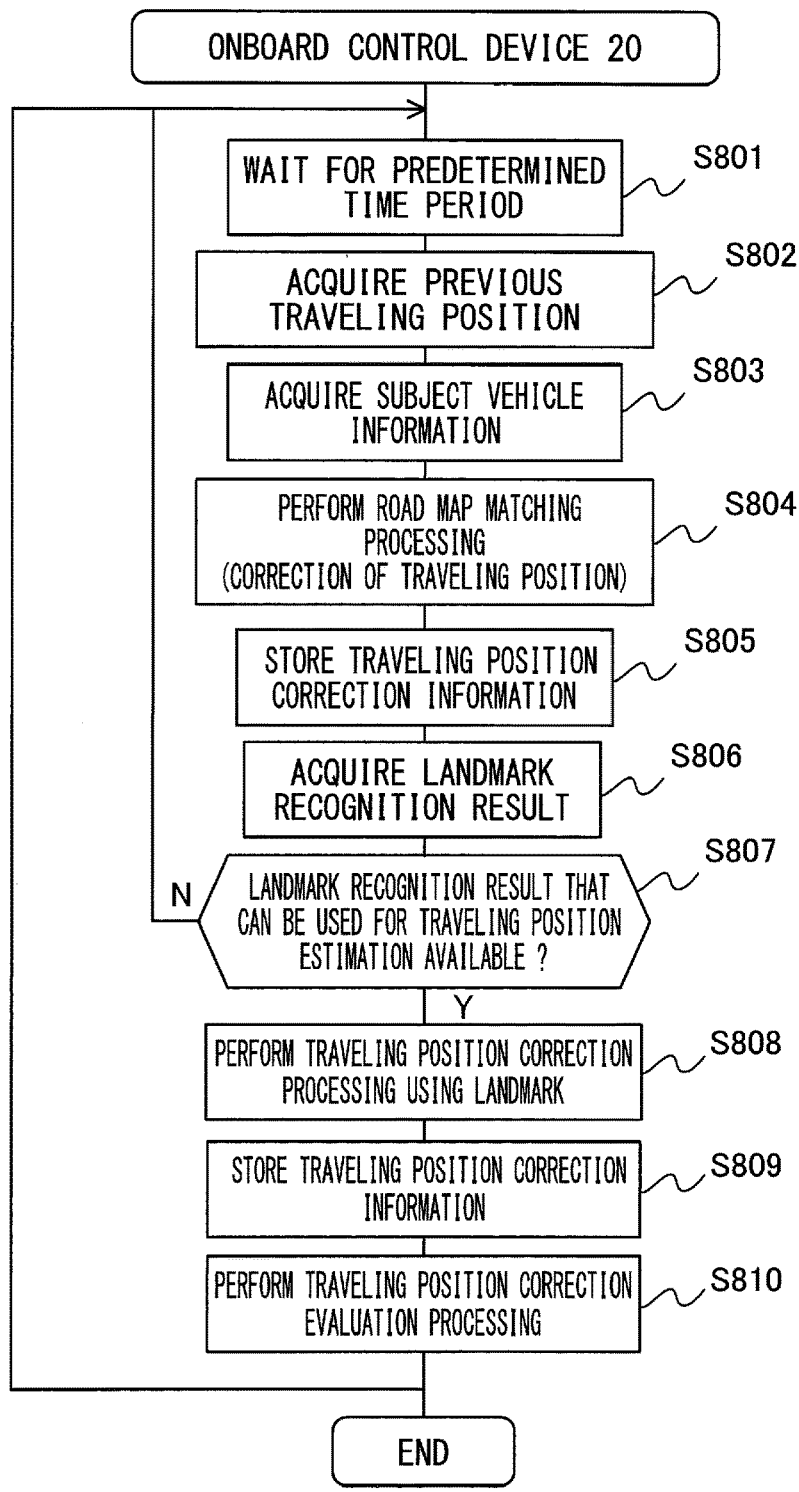
FIG. 14 shows a flow of subject vehicle position estimation processing executed by the onboard control device according to the first embodiment of the present invention.

FIG. 14 shows the flow 800 of subject vehicle position estimation processing executed by the onboard control device 20 according to the first embodiment of the present invention.

First, after having waited for a predetermined time period (step 801), the subject vehicle position estimation unit 206 of the onboard control device 20 acquires from the subject vehicle information data group 222 the traveling position information for the subject vehicle that was estimated on the previous iteration of this routine (step 802). The traveling position information that is acquired in this step 802 is information that specifies the position upon the road map where the vehicle 2 is traveling: for example, it may be the road link ID of the road link upon which the vehicle 2 is traveling and the offset position of the vehicle 2 along that road link.

Next, in step 803, subject vehicle information is acquired from the subject vehicle information data group 222, such as the newest history over a predetermined time period of its position information in the global coordinate system (latitude, longitude, and so on) obtained from the subject vehicle position measurement device 40, the newest history of information related to shifting of the vehicle 2, such as its running speed, its azimuth of progression, its yaw angle and so on obtained from the sensor group 60, and so on.

And correction of the traveling position of the vehicle is performed by map matching processing, using the subject vehicle information that was acquired in step 803 (step 804). This road map matching processing is processing in which the degree of agreement with the road link of the road map data group 221 is calculated from the position information in the global coordinate system, the shifting information for the vehicle, and the history of that information, and thereby the road link along which the vehicle 2 is traveling and its position upon that road link are estimated (this is termed "map matching processing"). However, since it is not possible to estimate the position of the vehicle upon the road link in an accurate manner only by such map matching processing, in relation to the position of the vehicle upon the road link, a value for the differential of this position with respect to the previous iteration of this routine is calculated from the shifting information of the vehicle 2 (i.e. its speed, its azimuth of progression, its yaw angle, and so on) from the time point at which the traveling position was estimated during the previous iteration, and processing for correction is performed based thereupon (this is termed "dead reckoning processing"). It should be understood that, if the subject vehicle position measurement device 40 is already endowed with a similar function (of dead reckoning), then it would also be acceptable to perform this correction by using differential values of latitude and longitude outputted from that measurement device. Furthermore, while sometimes it may happen that it is not possible to specify the traveling position of the vehicle 2 if the subject vehicle position measurement device 40 fails in its measurement of position or due to a position measurement error or the like, it will be supposed that, in step 804, the flow of control does not proceed onward to the next step until it is possible to specify the traveling position.

When correction of the traveling position has been completed in step 804, the traveling position correction result is stored in the subject vehicle information data group 222 (step 805). This traveling position correction result may, for example, include the corrected traveling position, the means of correction (whether it was map matching or dead reckoning), the correction time point, and the like.

Next in step 806 the subject vehicle position estimation unit 206 acquires the landmark recognition result that has been outputted by the landmark recognition unit 204 from the landmark recognition data group 224. The relative distance and the relative direction until the landmark can actually be recognized are included in this landmark recognition result.

Then in step 807 the subject vehicle position estimation unit 206 decides whether or not, among the landmark group that has been recognized, there is one landmark that is appropriate as a subject for road position estimation. If no such appropriate landmark has been recognized, then the flow of control returns to step 801 (NO in step 807). But if an appropriate landmark is present, then the flow of control proceeds to the next step (YES in step 807). Whether or not a subject for road position estimation is appropriate may be determined, for example, by comparing together the position estimation evaluation value and the accuracy obtained in position estimation of that landmark data. For example, if the position estimation level obtained by the onboard control device 20 is B (for example, an error of 1 to 3 m), then, in the landmark data group 223 of FIG. 5, the traffic light 7140 whose position estimation evaluation value is C is not appropriate as a subject of position estimation. Furthermore, it would also be acceptable to determine whether or not a subject for road position estimation is appropriate by comparing together the position estimation evaluation value of that landmark data and the current position estimation accuracy. For example, the accuracy of current position determination may be set, directly after performing position correction using landmark data, to the position estimation evaluation value of that landmark; may be set to a position estimation accuracy D (for example, an error of 10 m or more) if position correction has been performed by map matching; may be set to a value that becomes worse according to the distance that has been traveled after position correction has last been performed using landmark data; and so on. While it is not possible to use the same traffic light 7140 as in the previous example as a subject for position estimation if the current position estimation accuracy is B, however, if the current position estimation accuracy is D, then it does become acceptable to use the traffic light 7140 as a subject for position estimation.

If one or more appropriate landmarks for recognition are present in step 807, then traveling position correction processing using those landmark recognition results is performed (step 808). This traveling position correction using a landmark is implemented by calculating the position of the vehicle upon the road map on the basis of its relative distance and its relative direction, which have been calculated by landmark recognition with respect to a landmark whose three dimensional position upon the road map is known. If there are a plurality of landmark recognition results, then it would also be possible to calculate the position of the subject vehicle from its relative distances from this plurality of landmarks, without using its relative direction. The traveling position correction information of step 808 is stored in the subject vehicle information data group 22 (step 809). For example, the corrected traveling position, the means of correction (i.e., landmark), the landmark ID of the landmark employed for correction, the time point of correction, and so on may be included as the traveling position correction result.

When the traveling position correction processing up to step 809 has been completed, the subject vehicle position estimation result evaluation unit 207 performs evaluation of the traveling position correction processing that has been implemented in the past, using the traveling position correction information that is stored in the subject vehicle information data group 222 (step 810). For example, in FIG. 12, in the position estimation using the landmark 8101-1, from the estimated position up to that time (for example, the position estimation with the landmark 8100-2) correction was performed by the amount of 20 m rearward; in the position correction using the landmark 8110-1, this corrected position was corrected by the amount of 20 m forward; and there was almost no position correction for the position estimation in which the landmark 8130-1 was used. By contrast to the fact that, in this case, the tendency of the position estimation was consistent apart from the landmark 8100-2, in the case when the landmark 8101-1 was used, there was a great deviation from the tendency of position estimation up until that time. In this case, it may be considered that there is an error in the position estimation with the landmark 8101-1. Various kinds of cause may be considered for this: for example, there may be an error in the position information for the landmark 8101-1 (an error in the road map data, a change of the arrangements in the locality, or the like), or an image that resembles the landmark 8101-1 may be present in its neighborhood and may have been erroneously recognized, or there may have been an error in the result of calculation of the relative relationship during landmark recognition, or the like. If an error in position estimation has occurred in this manner, then, due to requirements for position estimation accuracy of an application that operates using the position of the vehicle 2, there is a possibility that this error may exert a negative influence. For example, in the case of a travel control application whose requirements with regard to accuracy of position estimation are very severe, there is a possibility that an error of the type described above may lead to mistaken operation. On the other hand there are cases in which there is no problem even if an error like that described above occurs, such as in the case of an application in which an error more or less will not exert any influence, if the road link upon which the vehicle is traveling has been determined by a navigation device or the like. Thus, in step 810, for each landmark, the position estimation error by using that landmark is evaluated, and is stored in the landmark recognition data group 224. And, as in a landmark evaluation result transmission processing flow 900 that will be described hereinafter, evaluation results related to these position estimation errors are transmitted to the vehicle position estimation support server 10 as a part of the landmark evaluation result information, are aggregated by the vehicle position estimation support server 10, and are reflected in the position estimation evaluation values for the landmark data distributed to the vehicles 2. Due to this, it becomes possible to recognize landmarks for which position estimation errors occur, and, in step 807 of this subject vehicle position estimation processing flow 800, it becomes possible to comb through and to select the landmark recognition results that are to be used for position estimation, according to the current requirements related to position accuracy.

According to the above, a single cycle of the subject vehicle position estimation processing flow 800 is completed, and the flow of control returns back to step 801 again, so that similar processing is repeatedly executed.

Figure 15:
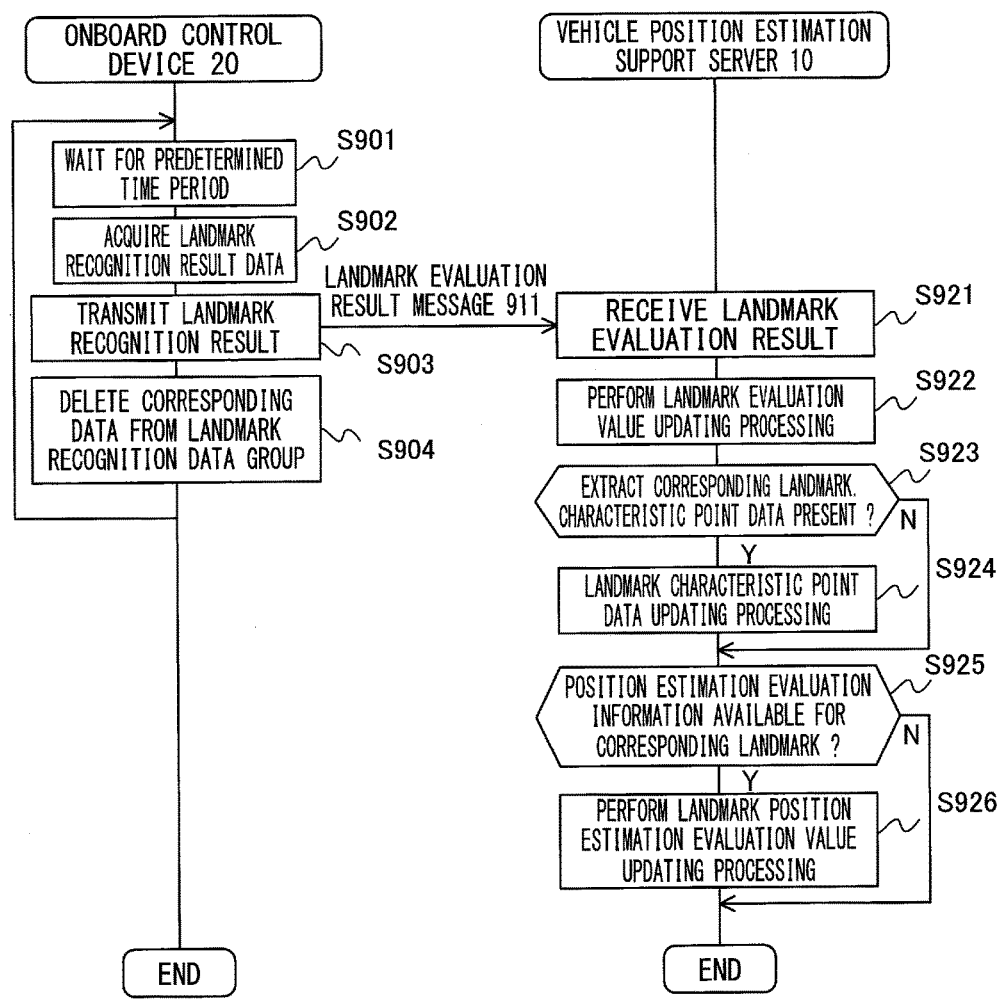
FIG. 15 shows a flow of landmark evaluation result transmission processing executed by the vehicle travel control system according to the first embodiment of the present invention.

FIG. 15 shows the flow 900 of landmark evaluation result transmission processing executed by the onboard control device 20 according to the first embodiment of the present invention.

First, after having waited for a predetermined time period (step 901), the landmark evaluation result transmission unit 208 of the onboard control device 20 acquires data related to the landmark recognition results from the landmark recognition data group 224 (step 902). The landmark recognition result data acquired in step 902 includes, for the landmark group that is the subject of recognition, evaluation results of landmark recognition for which evaluation has already been completed (in other words, the subject recognition range of those landmarks has been passed through), evaluation results related to position estimation performed on the basis of those recognition results, image data for landmarks that have been recognized, and so on.

The landmark evaluation result transmission unit 208 generates a landmark evaluation result message 911 on the basis of the landmark recognition result data acquired in step 902, and transmits this message that it has thus generated to the vehicle position estimation support server 10 (step 903). When step 903 has been completed, the corresponding landmark evaluation result is deleted from the landmark recognition data group 224 (step 904). According to the above, a single cycle of the landmark evaluation result transmission processing flow 900 in the onboard control device 20 is completed, and the flow of control returns back to step 901 again, so that similar processing is repeatedly executed.

Figure 16:
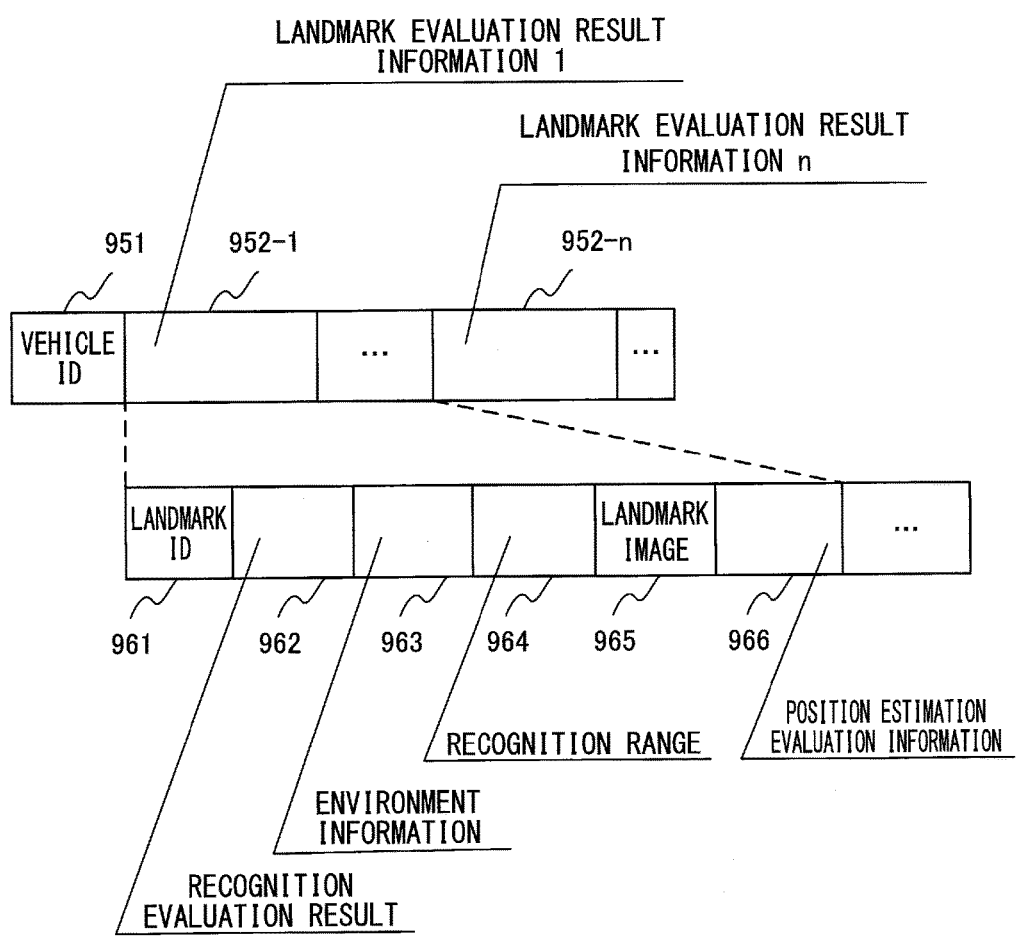
FIG. 16 is an explanatory figure showing an example of the format of a landmark evaluation result message transmitted by a travel control device according to the first embodiment of the present invention.

FIG. 16 is an explanatory figure showing an example of the format 950 of a landmark evaluation result message 911 transmitted by the onboard control device 20 according to the first embodiment of the present invention. However, header information related to the communication protocol and so on is omitted from this figure.

The landmark evaluation result message 911 includes the vehicle ID 951, one or more items of landmark evaluation result information 952 (952-1 through 952-n), and so on. It would be acceptable for the various types of information described above to be transmitted as a single message, as in the landmark evaluation result message format 950 shown in the figure; or, alternatively, it would be acceptable for this information to be divided into any desired plurality of messages and then transmitted.

The vehicle ID 951 is an identifier for the vehicle 2, and is a data item for enabling the vehicle 2 to be uniquely identified by the vehicle position estimation support server 10.

The landmark evaluation result information 952 is acquired by the onboard control device 20 in step 902, and corresponds to the landmark recognition result data; for example, each item thereof may include a landmark ID 961, a recognition evaluation result 962, environment information 963, a landmark image group 964, position estimation evaluation information 965, and so on.

The landmark ID 961 is an identifier for uniquely specifying the corresponding landmark.

The recognition evaluation result 962 is the evaluation result of landmark recognition, and corresponds to the output contents of the landmark recognition evaluation processing (step 709) of the landmark recognition processing flow 700.

The environment information 963 is information related to the environment surrounding the vehicle 2 at the landmark recognition time point. For example, this may correspond to the surrounding brightness, the surrounding weather, or the like.

The recognition range 964 is information related to the road range over which it is possible to recognize the landmark. For example, this could be expressed in a data format that is equivalent to that for the subject recognition range 356 of the landmark data group 122, or it could be expressed as a relative distance to that landmark (for example, a range of 100 m to 5 m).

The landmark image group 965 includes, for example, a landmark image which is a partial image of the recognized portion of the landmark that has been extracted from image data, or a landmark image with characteristic points extracted from the partial image. The landmark image group 965 may include all of the landmark evaluation result information 952; or it would also be acceptable for a landmark only to be included therein if the recognition evaluation value of that landmark is low, or if the degree of agreement during recognition is low. If the recognition evaluation value is high, or if the degree of agreement during recognition is high, then, since this means that the current landmark image stored in the vehicle position estimation support server 10 is suitable, accordingly the significance of feedback to the vehicle position estimation support server 10 is low. Due to this, in this type of case, it is possible to reduce the amount of communication upon the network 4 by curtailing the landmark image group 965.

The position estimation evaluation information 966 is the evaluation result of position estimation for that landmark, and corresponds to the output contents of the traveling position correction evaluation processing (step 810) of the subject vehicle position estimation processing flow 800.

We now return to the explanation of the landmark evaluation result transmission processing flow 900 (FIG. 15). The landmark evaluation result reception unit 104 of the vehicle position estimation support server 10 receives, via the network 4, the landmark evaluation result message 911 transmitted from the onboard control device 20 in step 921. Although this is not shown in the figures, it should be understood that, when the landmark evaluation result reception unit 104 receives the landmark evaluation result message 911, it analyses that message according to its format 950, and extracts data of various types.

Next, the recognition evaluation value for each landmark calculation unit 105 of the vehicle position estimation support server 10 executes landmark evaluation value updating processing (step 922). This landmark evaluation value updating processing is processing to update the recognition evaluation values 358 of the corresponding data entries of the landmark data group 122 on the basis of information included in the landmark evaluation result information items 952 of the landmark evaluation result message 911.

First, from the landmark data group 122, the recognition evaluation value for each landmark calculation unit 105 refers to the landmark ID 961, the environment information 963, and the recognition range 964 in the landmark evaluation result information 952, and acquires the corresponding data entry. And next, it updates the recognition evaluation value 358 of that data entry on the basis of the recognition evaluation result 962.

In the most simple case, the recognition evaluation result 962 is expressed as one of two values, success (=1) or failure (=0). However, this form of expression should not be considered as being limitative; it would also be acceptable for this recognition evaluation result to be expressed by an index of the degree of success that can assume any desired value from 0 points (perfect failure) to 100 points (perfect success).

While there is a method for updating the recognition evaluation value 358, it would also be acceptable, for example, to update the evaluation value by, when the recognition evaluation result 962 relating to the landmark data entry that has been acquired as described above is "succeeded", arranging to add a predetermined numerical value (for example +0.1) to the evaluation value that was stored as the recognition evaluation value 358, and, when the recognition evaluation result is "failed", arranging to subtract a numerical value (for example −3.0) from the evaluation value of the recognition evaluation value 358. If the numerical value that is subtracted from the evaluation value upon failure is set to be sufficiently greater than the numerical value that is added upon success, then the evaluation value decreases relatively abruptly when the frequency of landmark recognition has increased. Due to this, it becomes possible rapidly to lower the evaluation value for a landmark for which the frequency of recognition failures is high. It should be understood that, if the recognition evaluation result 962 is not two-valued but is expressed as one of a plurality of levels, then it would be possible to vary the weightings of the numerical values by which it is regulated up and down, according to the extent by which recognition succeeds or fails.

Furthermore, it would be possible to arrange for the recognition evaluation value 358 to be expressed as the success ratio for landmark recognition over a predetermined interval. In this case, if for example the predetermined interval is taken as being one month, it will be acceptable to calculate the recognition evaluation values 358 by managing the number of successes and the total number of recognition evaluations (number of successes+number of failures) by unit time periods (for example, one day) that are sufficiently smaller than the predetermined period, and by calculating the success ratios during the corresponding predetermined intervals. It should be understood that, in this calculation of the success ratio, it would also be possible to give different weightings to the success ratio and to the failure ratio. For example, by calculating the success ratio while giving a weighting to the number of failures of 30 times that of the number of successes, it becomes possible to lower the evaluation value rapidly for a travel control classification whose failure frequency is high, in a similar manner to the case described above of adding +0.1 or −3.0. Moreover, for example, it would also be acceptable to calculate the evaluation values at different interval levels, such as one hour, one day, and one month, and to store these. By doing this, if for example it has not been possible to recognize an abrupt change in the environment (such as, for example, change of a road sign or a road marking due to road works or the like), then it becomes possible immediately to eliminate that object as a subject for landmark recognition, since its evaluation value will abruptly become worse over a short period of time. On the other hand, by viewing the evaluation value of a landmark over the long term, it is possible to confirm whether or not it is possible for that landmark to be recognized in a stable manner, irrespective of day to day changes of the environment.

Moreover, if the recognition evaluation value 358 is not updated at fixed time intervals, it would also be acceptable for it to be adjusted so that, along with the lapse of time, it approaches an intermediate value (for example, 50). Since the possibility is high that landmark data for which the recognition evaluation value 358 is low will not become a subject for landmark recognition, accordingly its recognition evaluation results will no longer be gathered by the vehicle position estimation support server 10. In this case this means that the recognition evaluation value 358 is not updated, even supposing that the environment changes and actually that landmark has become easy to recognize. Thus, if the recognition evaluation value 358 is not updated at fixed time intervals, by intentionally improving the recognition evaluation value 358, before long some of the vehicles 2 will take this landmark as a subject for recognition, so that this recognition evaluation value 358 will be updated for a second time. By doing this, even if the environment has changed, it becomes possible to reflect this automatically in the recognition evaluation value 358.

When the landmark evaluation value updating processing in step 922 has ended, the recognition and evaluation calculation unit for each landmark 105 next checks whether or not there is a landmark image 965 for that landmark (step 923), and performs landmark image updating processing in step 924 (YES in step 923) if there is such a landmark image. But if there is no such a landmark image, then the flow of control proceeds to step 925.

The landmark image updating processing is processing to update the landmark image 357 of the corresponding data entry of the landmark data group 122 on the basis of the landmark image group 965 that is included in the landmark evaluation result information items 952 of the landmark evaluation result message 911. The landmark image 357 is a template for the onboard control device 20 of the vehicle 2 to recognize the landmark from the image data. Due to this, it is desirable for the landmark image to be one that will be effective even if the environment changes somewhat; and, desirably, the landmark image 357 will be generated by averaging landmark images that include, not only the landmark image group 965 of this particular landmark evaluation result message 911 at this time, but also the landmark image groups 965 that have been received in the past. When the landmark image group 965 of the landmark evaluation result message 911 is image data from the camera, then, after the recognition and evaluation calculation unit for each landmark 105 extracts characteristic points from that image data and generates the landmark image, it is averaged with the past landmark images, so as to create the landmark image 357.

It would also be acceptable to omit the landmark image updating processing, according to requirements. If the recognition evaluation result 962 of the landmark evaluation result information 952 is a high evaluation (if it is possible to determine the extent of success when recognition succeeds), or if the recognition evaluation value 358 is high, then there is not much meaning in performing updating, since this means that the current landmark image 357 agrees with reality. On the other hand, if the recognition evaluation result 962 is a low evaluation, or if the recognition evaluation value 358 is low, then an improvement of the recognition ratio may be anticipated by performing updating, since this means that the current landmark image 357 does not agree with reality. Thus, desirably, it should be arranged to update the landmark image 357 of the landmark in question if the recognition evaluation result 962 or the recognition evaluation value 358 is lower than a predetermined value. Furthermore, it would also be acceptable for this not to be executed during the landmark evaluation result transmission processing flow 900, but rather for processing of the entire landmark image group 965 to be performed all together by collecting it together at fixed intervals (for example, every day).

Yet further, just like the recognition evaluation value, it would also be possible to create and to store the landmark image 357 at different interval levels, for example one hour, one day, or one month. By doing this, it also becomes possible to respond to an abrupt environmental change by recognizing landmarks by using landmark images over a short interval.

When the landmark evaluation value updating processing of step 924 has been completed, the position estimation evaluation for each landmark calculation unit 106 next makes a check as to whether there is any position estimation evaluation information 966 for that landmark (step 925), and if there is such information, then landmark image updating processing is performed in step 926 (YES in step 925). But if there is no such information, then the processing by the vehicle position estimation support server 10 terminates.

The landmark position estimation evaluation value updating processing is processing for updating the position estimation evaluation value 359 of the corresponding data entry of the landmark data group 122 on the basis of the position estimation evaluation information 966 included in the items of landmark evaluation result information 952 of the landmark evaluation result message 911. Fundamentally, the same processing is performed as for updating of the recognition evaluation value described above. For example, this may be determined by the average value of the position estimation evaluation information 966 obtained over a predetermined interval.

The processing on the side of the vehicle position estimation support server 10 in the landmark evaluation result transmission processing flow 900 is completed as described above.

As described above, according to this embodiment of the present invention, the onboard control devices 20 of the vehicles 2 evaluate the recognition results for the landmarks, and, by these landmark evaluation results being accumulated by the vehicle position estimation support server 10, it is possible quantitatively to evaluate the recognition failure ratio or the recognition success ratio for each landmark. This recognition failure ratio for a landmark means the probability of not being able to recognize that landmark correctly even though actually the landmark is present, due, for example, to a recognition error or to an erroneous recognition. And, by the vehicle 2 acquiring from the vehicle position estimation support server 10 the recognition evaluation values, which are indicators for each landmark that numerically express their recognition failure ratios, and by a landmark being eliminated as a subject for landmark recognition if its recognition evaluation value is lower than a predetermined value, it is possible to enhance the success ratio and the accuracy of landmark recognition. As a result, it becomes possible to enhance the success ratio and the accuracy of position estimation using the results of landmark recognition to higher levels than in the prior art.

Furthermore, according to this embodiment, if there are a plurality of candidates for landmarks to serve as a subject for recognition, the onboard control device 20 of the vehicle 2 preferentially selects a predetermined number of landmarks from those landmarks whose recognition evaluation values are high. Due to this, even if it is only possible to execute recognition processing for a portion of the landmark candidates due to constraints upon the processing capability of the onboard control device 20, still it becomes possible to enhance the success ratio of landmark recognition to the maximum limit, since selection as recognition subjects is preferentially made from those landmarks that are easy to recognize.

Yet further, according to this embodiment, as the template images for landmark recognition, the vehicle position estimation support server 10 does not use landmark images in common for each landmark classification, but rather generates them individually on the basis of images that have actually been photographed by each vehicle in the environment in which each of the landmarks is installed. There is a problem of decrease of recognition ratio with the use of common template images in landmark recognition, since even landmarks of the same type classification sometimes look different due to differences in their respective positional and temporal environments and due to deterioration and fouling and so on; but it is possible to enhance the success ratio of landmark recognition by providing individual template images. Furthermore, according to this embodiment, the preparation of individual template images is made possible by not limiting each of the landmarks to a single template image, but by providing various different template images that are classified along various axes such as brightness (day-time, night-time, and so on), weather (rain, snow, fog, and so on), location (subject recognition range), and so on. Due to this, it is possible to select an appropriate landmark while being conscious of fluctuations in the recognition success ratio due to changes of the environment, so that it is possible to enhance the recognition ratio.

Still further, according to this embodiment, the vehicle position estimation support server 10 collects the image data or the landmark image data during landmark recognition from the onboard control devices 20 of the vehicles 2, and updates the landmark image data for each landmark. Due to this, even if the way in which the landmark appears changes due to change of the landmark itself or change of its surrounding environment, it is still possible to distribute landmark image data corresponding to its newest state to the onboard control devices 20 of the vehicles 2. And, because of this, it becomes possible further to enhance the success ratio of landmark recognition.

Embodiment #2

Figure 17:
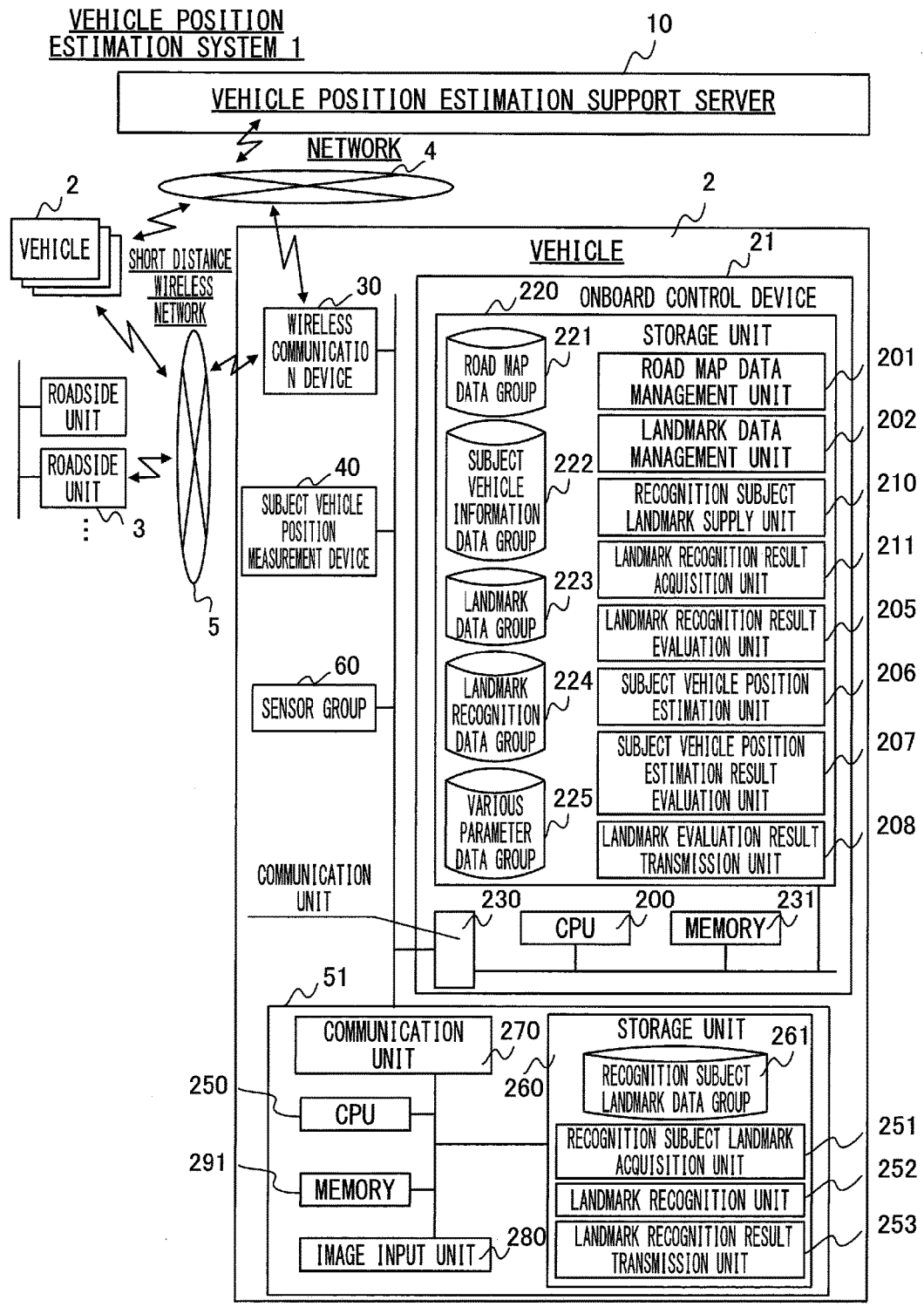
FIG. 17 is a functional block diagram showing an example of the structure of a vehicle position estimation system according to a second embodiment of the present invention.

FIG. 17 is a functional block diagram showing an example of the structure of a vehicle position estimation system according to a second embodiment of the present invention.

With the vehicle position estimation system 1 according to this second embodiment, by contrast to the fact that in the first embodiment the landmark recognition processing was implemented by the onboard control device 20 acquiring the camera image data from the camera device group 50, the feature of difference is that the landmark recognition processing is implemented by a camera device group 51 acquiring landmark information for the subject of recognition from an onboard control device 21. Since, except for the camera device group 51 and the onboard control device 21, the structure is equivalent to that of the first embodiment, accordingly here only the structures of the camera device group 51 and of the onboard control device 21 will be explained.

The camera device group 51 of this embodiment is installed in the vehicle 2 so as to be capable of photographing the exterior of the vehicle 2, and is adapted to generate still image data or video image data by repeatedly photographing the situation surrounding the vehicle 2. It should be understood that this camera device group 51 may be a monocular camera, or may be a stereo camera to which a plurality of photographic elements are mounted, or may be any desired combination of any number of monocular cameras and stereo cameras, or may be an integrated unit consisting of one or more cameras, as desired, and of an ECU that performs other processing.

The camera device group 51 comprises a processing unit, a storage unit 260, a communication unit 270, and an image input and output unit 280.

The processing unit comprises, for example, a CPU 250 and a memory 291 such as a RAM or the like, and performs processing to implement the functions of the camera device group 51 by executing a predetermined operating program. Moreover, as functional blocks, a recognition subject landmark acquisition unit 251 that acquires data related to the landmark group that is to be recognized from the image data that has been photographed, a landmark recognition unit 252 that recognizes the landmark group that is to be recognized and that has been acquired from the image data that has been photographed, a landmark recognition result transmission unit 253 that transmits the result of recognition of that landmark group that is to be recognized, and so on are included in the processing unit.

The storage unit 260, for example, may include an HDD, a flash memory, a ROM or the like, and stores the program that is executed by the processing unit and data groups and so on that are required for implementation of this system. In this embodiment, in particular, a recognition subject landmark data group 261 is stored in the storage unit 260.

The communication unit 270 is equivalent to the communication unit 230 of the onboard control device 20 of the first embodiment.

And the image input unit 280 comprises one or more image capturing units, with an image related to the exterior of the vehicle 2 being inputted from those image capturing unit or units. The image that has been inputted is extracted as image data by the processing unit according to a predetermined method, for example, and is used for the processing of this embodiment.

Instead of the camera image data acquisition unit 203 and the landmark recognition unit 204 of FIG. 1, in FIG. 17, a recognition subject landmark supply unit 210 that supplies the landmark group that is the subject of recognition to the camera device group 51 and a landmark recognition result acquisition unit 211 that acquires the result of landmark recognition by the camera device group 51 and so on are included in the processing unit of the onboard control device 21. Explanation of other structures will be omitted, since they are the same as in FIG. 1.

Next, the operation of this vehicle position estimation system 1 according to this second embodiment will be explained.

While the fundamental processing is equivalent to that in the first embodiment, the landmark recognition processing flow 700 of the first embodiment shown in FIG. 11 is changed in this second embodiment, in order to accommodate processing performed by the camera device group 51 for landmark recognition. In concrete terms, the processing flow that corresponds to the landmark recognition processing flow 700 is separated into a recognition subject landmark transmission processing flow 1000 that the onboard control device 21 performs with respect to the camera device group 51, and a landmark recognition processing flow 1100 in which the camera device group 51 recognizes a landmark that is a recognition subject and transmits this recognition result to the onboard control device 21.

Figure 18:
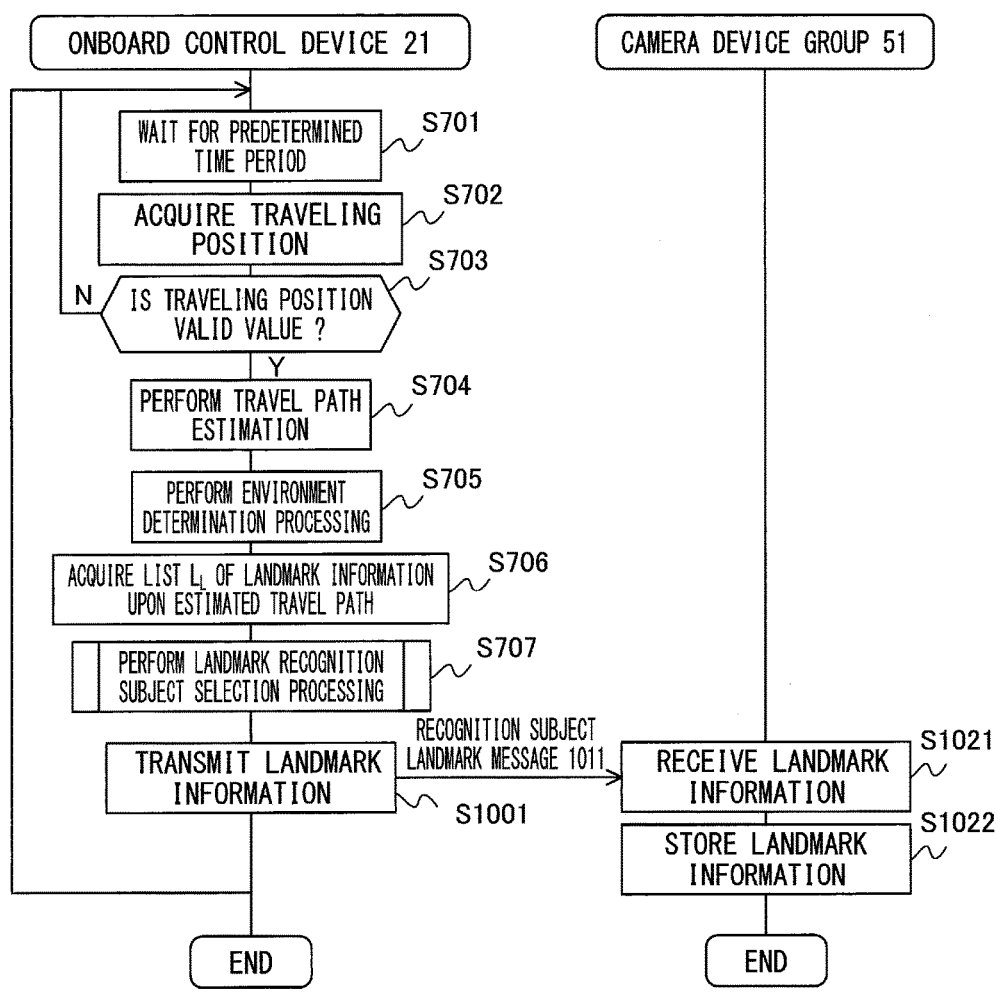
FIG. 18 shows a flow of recognition subject landmark transmission processing executed by a vehicle travel control system according to this second embodiment of the present invention.

FIG. 18 shows the flow 1000 of recognition subject landmark transmission processing executed in the vehicle position estimation system 1 according to this second embodiment of the present invention.

First, since steps 701 through 707 of the onboard control device 21 are equivalent to steps 701 through 707 of the onboard control device 20 of the first embodiment, accordingly explanation thereof will be omitted. In the first embodiment, after step 707, the onboard control device 21 implemented processing for landmark recognition, but in this second embodiment the recognition subject landmark supply unit 210 generates a recognition subject landmark message 1011 on the basis of the landmark information selected in step 707, and transmits this message that has thus been generated to the camera device group 51 (step 1001).

Figure 19:
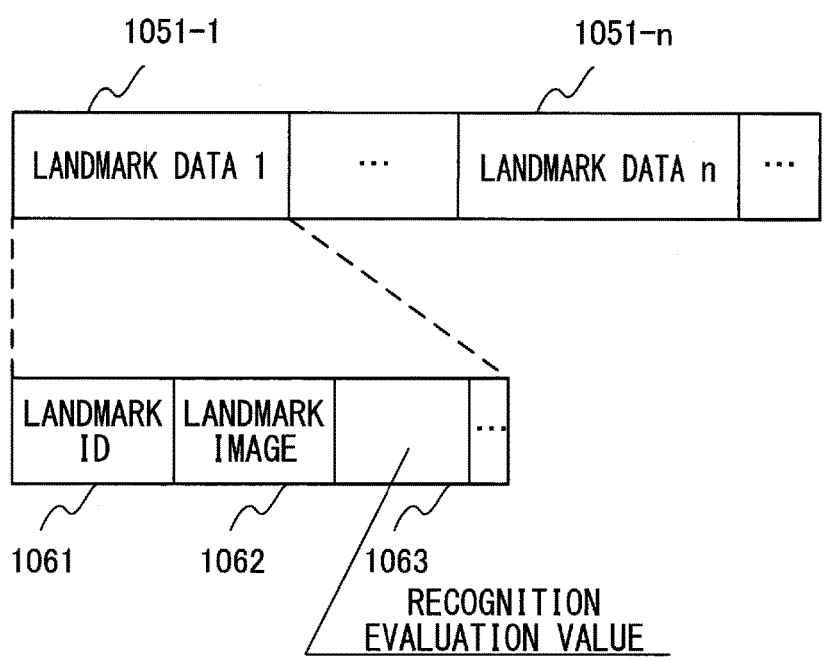
FIG. 19 is an explanatory figure showing an example of the format of a recognition subject landmark message transmitted by an onboard control device according to the second embodiment of the present invention.

FIG. 19 is an explanatory figure showing an example of the format 1050 of this recognition subject landmark message 1011 transmitted by the onboard control device 21 according to the second embodiment of the present invention. However, header information related to the communication protocol and so on is omitted from this figure.

The recognition subject landmark message 1011 includes a list or the like of the landmark data 1051 that was selected in step 707. An item of this landmark data 1051 may include, for example, a landmark ID 1061, a landmark image 1062, a recognition evaluation value 1063, and so on, these respectively corresponding to the landmark ID 371, to the landmark image 377, and to the recognition evaluation value 378 of the landmark data group 223 of the onboard control device 21.

We now return to the explanation of the recognition subject landmark transmission processing flow 1000 (FIG. 18). The recognition subject landmark acquisition unit 251 of the camera device group 51 receives the recognition subject landmark message 1011 transmitted from the onboard control device 21 (step 1021), and stores the list of landmark data 1051 included in that message in the recognition subject landmark data group 261 of the storage unit 260 (step 1022).

According to the above, a single cycle of the recognition subject landmark transmission processing flow 1000 is completed, and the flow of control returns back to step 701 again, so that similar processing is repeatedly executed.

It should be understood that although, in the processing flow of FIG. 18, it was shown that the onboard control device 21 transmits the data of the recognition subject landmark in each processing cycle, if the camera device group 51 has already received the same landmark data, then it would also be possible to transmit only the landmark ID 1061 of that landmark, and to omit the landmark image 1062 and the recognition evaluation value 1063. Moreover, as a different method, it would also be acceptable to arrange to control the recognition subject landmark data group 261 of the camera device group 51 by sending the recognition subject landmark message 1011 described above at the time point that the recognition subject is selected, and by sending a message that specifies that the landmark has been removed from the subjects for recognition at the time point that the landmark actually is removed from the subjects for recognition.

Figure 20:
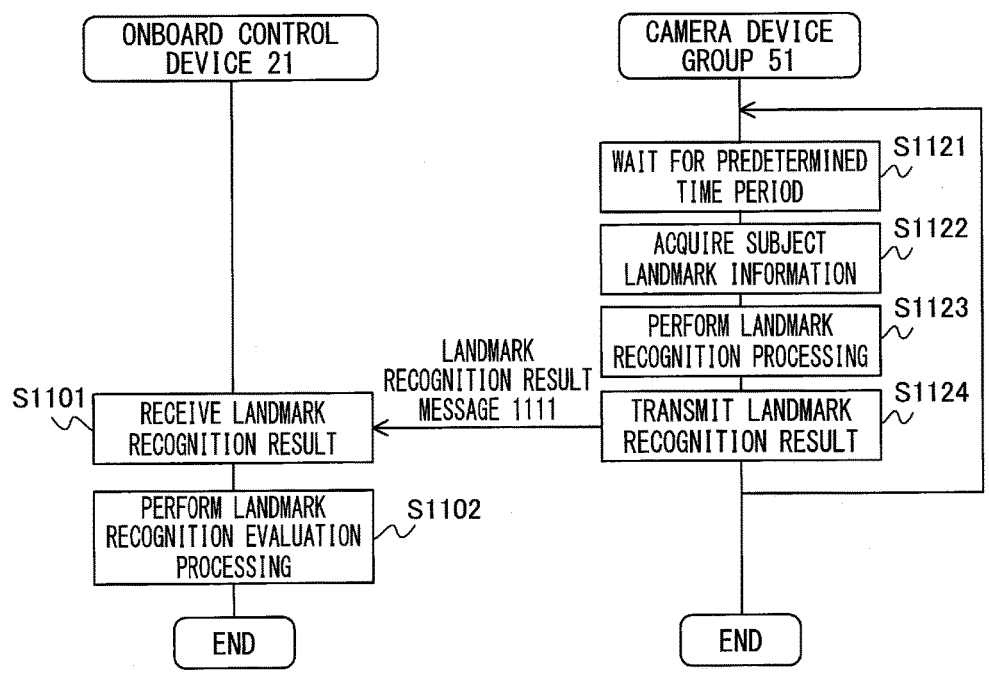
FIG. 20 shows a flow of landmark recognition processing executed by the vehicle travel control system according to the second embodiment of the present invention.

FIG. 20 shows the flow 1100 of landmark recognition processing executed by the vehicle position estimation system 1 according to the second embodiment of the present invention.

First, after having waited for a predetermined time period (step 1121), the landmark recognition unit 252 of the camera device group 51 acquires information specifying the recognition subject landmark from the recognition subject landmark data group 261 (step 1122). And landmark recognition processing is implemented on the basis of this landmark information that has thus been acquired (step 1123). This landmark recognition processing corresponds to the landmark recognition processing (step 708) of the landmark recognition processing flow 700. In other words, by scanning the image data using the landmark image of the landmark that is the subject for processing and by performing pattern matching processing, it is recognized whether or not that landmark is present in that image data, and, if it has thus been recognized, the relative relationship of the vehicle with respect to that landmark (i.e. the relative distance, and/or the relative direction, and so on) is calculated.

It should be understood that, although here the landmarks that are to be the subjects of recognition are selected by the onboard control device 21, and the camera device group 51 performs recognition processing upon them all in a uniform manner, it would also be acceptable to process them while prioritizing them according to their recognition evaluation values 1063, and/or further to limit the landmarks that are to be the subjects of recognition according to the processing performance of the camera device group 51.

Next, on the basis of the landmark recognition result of step 1123, the landmark recognition result transmission unit 253 of the camera device group 51 creates a recognition result message 1111, and transmits this message that has thus been created to the onboard control device 21 (step 1124).

FIG. 21 is an explanatory figure showing an example of the format 1150 of a landmark recognition result message 1111 transmitted by the camera device group 51 of the second embodiment of the present invention. However, header information related to the communication protocol and so on is omitted from this figure.

This landmark recognition result message 1111 includes a list of landmark recognition results 1151, which is recognition result information for the landmarks recognized in step 1123, and so on. For example, a landmark ID 1161, a position measurement result 1162, a level of recognition 1163, a landmark image 1164, and so on may be included in each of the landmark recognition results 1151.

The landmark ID 1161 is an identifier for the landmark that has been recognized, and corresponds to the landmark ID that is used in the recognition subject landmark data acquired from the onboard control device 21.

The position measurement result 1162 is the result of position measurement processing for this landmark that has been recognized, and, for example, may include the relative distance and the relative direction from the vehicle 2 and so on.

The level of recognition 1163 is an index that specifies how reliably this landmark has been recognized, and, for example, corresponds to the degree of agreement in the pattern matching of the landmark recognition processing, or the like.

And the landmark image 1164 is an image produced by extracting the spot in the image data at which the landmark was recognized. This could be an image that has been extracted from the original image data, or could also be an image that has been extracted from the image data (i.e. the landmark image data) after predetermined processing has been performed.

We now return to the landmark recognition processing flow 1100 (FIG. 20). The landmark recognition result acquisition unit 211 of the onboard control device 21 receives the landmark recognition result message 1111 transmitted from the camera device group 51 (step 1101). And the landmark recognition evaluation processing is performed according to the landmark recognition result included in that message (step 1102). This landmark recognition evaluation processing is equivalent to the landmark recognition evaluation processing of the landmark recognition processing flow 700 (step 709).

According to the above, a single cycle of the landmark recognition processing flow 1100 is completed, and the flow of control returns back to step 1121 again, so that similar processing is repeatedly executed.

It should be understood that while, in the processing flow shown in FIG. 20, it is arranged to transmit image data that has been recognized by the camera device group 51 in every processing cycle, it would also be possible to transmit the image data while reducing the frequency at which it is included in the messages. Moreover it would also be acceptable, for example, according to a different method, to arrange for the camera device group 51 to store the image data whose level of recognition is highest in the storage unit 260, and to transmit that image data to the onboard control device 51 at the time point that it is removed from the subjects for recognition.

As has been described above, according to this second embodiment, the camera device group 51 has an interface that receives the landmark information that is to be recognized; it is possible to change the subject that is to be recognized and the landmark images for recognition on the basis of this landmark information that has been received; and it is possible to enhance the success ratio of landmark recognition by the camera device group 51 by the onboard control device 21 selecting, according to the situation, one or more landmarks that are easy to recognize, and notifying the camera device group 51 thereof. Moreover, by the recognition evaluation values that show ease of recognition being included in the landmark information that is transmitted from the onboard control device 21, and by the camera device 51 be adapted to perform recognition processing starting preferentially from those recognition evaluation values that are high, it is possible to enhance the landmark recognition success ratio to the maximum limit, even with processing performance that is limited.

It should be understood that the embodiments explained above are only examples, and that the present invention should not be considered as being limited thereby. In other words, applications of various types are possible, and all such embodiments are included within the scope of the present invention.

For example while, in the embodiment described above, the processing performed by the onboard control device and the processing performed by the vehicle position estimation support server were implemented by executing predetermined operating programs using processors and RAM, they may also be implemented with dedicated hardware, according to requirements. Moreover while, in the embodiment described above, the onboard control device, the wireless communication device, the subject vehicle position measurement device, the camera device group, and the sensor group were described as being separate devices, according to requirements, any two or more of them could be implemented as a combination device.

When the various processing flows described above are implemented by the processor executing predetermined operating programs, the information for implementing this processing such as operating programs, tables, files, and so on can be stored in a storage device such as a non-volatile semiconductor memory, a hard disk drive, an SSD (Solid State Drive) or the like, or upon a non-volatile computer readable data storage medium such as an IC card, an SD card, a DVD, or the like.

Furthermore while, in the embodiment described above, the onboard control device 20 was adapted to acquire the road map data group 221 from the vehicle position estimation support server 10, it would also be acceptable for the onboard control, device 20 itself to manage data that is equivalent to the road map data group 121, or, alternatively, it could also acquire this data from some other device internal to the vehicle 2.

Or, it would also be acceptable for each of the vehicles 2 to maintain information that is equivalent to the information in the storage unit 120 of the vehicle position estimation support server 10, and to perform landmark recognition and position estimation using the result of such landmark recognition on the basis of that information. In this case, the vehicle position estimation support server 10 would become unnecessary. However, by using the vehicle position estimation support server 10 as shown in the first embodiment, it becomes unnecessary for each of the vehicles 2 to maintain map data and landmark images that are not particularly related to that subject vehicle 2, and moreover it is possible to enhance the accuracy of landmark recognition and position estimation on the basis of evaluation results gathered from other vehicles 2 by the vehicle position estimation support server 10, even in the case of a subject vehicle 2 that is traveling along a road for the first time.

Furthermore, in the drawing, certain control lines and information lines have been shown because they have been considered to be required for explanation of the embodiments, but there is no limitation to necessarily showing all of the control lines and all of the information lines that are included in the actual manufactured product to which the present invention is applied. In actual application, it would be possible for almost all of the structures to be mutually connected together.

REFERENCE SIGNS LIST

1: vehicle position estimation system
2: vehicle
3: roadside unit
4: network
5: short distance wireless network
10: vehicle position estimation support server
20: onboard control device
30: wireless communication device
40: subject vehicle position measurement device
50: camera device group
60: sensor group
100: processing unit of vehicle position estimation support server 10
101: data request reception unit
102: road map data transmission unit
103: landmark data transmission unit
104: landmark evaluation result reception unit
105: recognition and evaluation calculation unit for each landmark
106: position estimation evaluation unit for each landmark
120: storage unit of vehicle position estimation support server 10
121: road map data group
122: landmark data group
123: various parameter data group
130: communication unit of vehicle position estimation support server 10
200: processing unit of onboard control device 20
201: road map data management unit
202: landmark data management unit
203: camera image data acquisition unit
204: landmark recognition unit
205: landmark recognition result evaluation unit
206: subject vehicle position estimation unit
207: subject vehicle position estimation result evaluation unit
208: landmark evaluation result transmission unit
220: storage unit of onboard control device 20
221: road map data group
222: subject vehicle information data group
223: landmark data group
224: landmark recognition data group
225: various parameter data group
230: communication unit of onboard control device 20
311: partial road map data group of roadside unit 3
312: landmark data group of roadside unit 3

The invention claimed is:

1. A vehicle position estimation system to estimate a position of a vehicle using an image captured by an image capturing device mounted to the vehicle, the vehicle position estimation system comprising:
a device configured to be mounted to the vehicle; and
a server that is connected to the device via a network,
wherein the server comprises:
a first wireless communication device configured to communicate over the network;
a first storage medium that stores landmark information for a plurality of landmarks, the landmark information including, for each landmark, a respective subject recognition range that represents a respective distance range of the landmark, a respective landmark image of the landmark, and a respective recognition evaluation value that represents ease of recognition processing using the respective landmark image;
a first processing unit programmed to:
calculate, for each landmark, the respective landmark image by averaging a plurality of previous images of the respective landmark; and
transmit the landmark information to the device with the first wireless communication device via the network, and
wherein the device comprises:
a second wireless communication device configured to communicate over the network;
a second storage medium that stores the landmark information received from the server; and
a second processing unit that programmed to:
receive captured image information corresponding to the image captured by the image capturing device mounted to the vehicle;
execute landmark information selection processing in which the landmark information to be used in the recognition processing is selected from the landmark information stored in the second storage medium based on the recognition evaluation values of the landmarks in the landmark information stored in the second storage medium which have the subject recognition ranges that correspond to a first position of the vehicle;
execute the recognition processing in which a characteristic object represented in the captured image information is recognized as one of the landmarks from the landmark images of the selected landmark information stored in the second storage medium;
execute position estimation processing in which the first position of the vehicle is corrected to a second position of the vehicle using the landmark information corresponding to the recognized one of the landmarks; and
transmit a landmark evaluation result message including a recognition result of the position estimation processing to the server with the second wireless communication device via the network,
wherein the first processing unit is further programmed to:
execute update processing in which the recognition evaluation value of the recognized one of the landmarks of the landmark information in the first storage medium is changed based on the recognition result of the position estimation processing included in the landmark evaluation result message received from the device.

2. The vehicle position estimation system according to claim 1, wherein:
the landmark information
stored in the second storage medium includes, for each landmark, the respective subject recognition range that represents the respective distance range of the landmark, the respective landmark image of the landmark, and the respective recognition evaluation value that represents ease of recognition processing using the respective landmark image.

3. The vehicle position estimation system according to claim 2, wherein:
the first processing unit is further programmed to:
select a subset of the landmark information based on the recognition evaluation values of the landmark information stored in the first storage medium;
transmit the selected subset of the landmark information to the device with the first wireless communication device via the network, and
the second storage medium stores the selected subset of the landmark information that has been received from the server.

4. The vehicle position estimation system according to claim 1, wherein:
the second processing unit is further programmed to:
transmit an acquisition request for the landmark information from the first storage medium, and the acquisition request includes travel path information specifying a travel path of the
vehicle to the server; and
the first processing unit is further programmed to:
select the landmark information in the first storage medium to be transmitted to the device based on the travel path information included in the acquisition request that has been received.

5. The vehicle position estimation system according to claim 1, wherein:
the second storage medium stores the landmark information for the plurality of landmarks, the landmark information further including, for each landmark, a plurality of respective landmark images of the landmark, each landmark image corresponding to a different environment of the landmark, and
the second processing unit is further programmed to:
execute the landmark information selection processing in which the landmark information to be used in the recognition processing is selected from the landmark information stored in the second storage medium further based on the landmarks having the respective landmark images that represent an environment of the captured image.

6. The vehicle position estimation system according to claim 5, wherein:
the second processing unit is further programmed to:
execute the recognition processing in which the characteristic object included in the captured image is recognized as one of the landmarks from the landmark images of the landmark information stored in the second storage medium that represent the environment of the captured image.

7. The vehicle position estimation system according to claim 1, wherein:

the first processing unit is further programmed to:
execute the update processing in which the recognition evaluation value of the recognized one of the landmarks of the landmark information in the first storage medium is averaged based on the recognition result of the position estimation processing received from the device.

8. The vehicle position estimation system according to claim 1, wherein the second control unit is further programmed to:
execute the landmark information selection processing in which the landmark information to be used in the recognition processing is selected as the landmark information stored in the second storage unit having the recognition evaluation values of the landmarks in the landmark information stored in the second storage unit which are higher than a predetermined threshold.

9. The vehicle position estimation system according to claim 1, wherein the first storage unit stores the landmark information for the plurality of landmarks, the landmark information further including, for each landmark, a respective position of the landmark.

10. The vehicle position estimation system according to claim 1, wherein the second position is an estimated position of the vehicle.

11. A vehicle position estimation device configured to be mounted on a vehicle to estimate a position of the vehicle using an image captured by an image capturing device mounted to the vehicle, comprising:
a communication device that receives captured image information corresponding to the image captured by the image capturing device;
a storage medium that stores landmark information for a plurality of landmarks, the landmark information including, for each landmark, a respective subject recognition range that represents a respective distance range of the landmark, a respective landmark image which is an average of a plurality of respective previous images of the landmark, and a respective recognition evaluation value that represents ease of recognition processing using the respective landmark image; and
a processing unit programmed to:
execute landmark information selection processing in which the landmark information to be used in the recognition processing is selected from the landmark information stored in the second storage medium based on the recognition evaluation values of the landmarks in the landmark information stored in the second storage medium which have the subject recognition ranges that correspond to a first position of the vehicle;
execute the recognition processing in which a characteristic object represented in the captured image information is recognized as one of the landmarks from the landmark images of the selected landmark information stored in the storage medium;
execute position estimation processing in which the first position of the vehicle is corrected to a second position of the vehicle based on the landmark information corresponding to the recognized one of the landmarks; and
transmit a landmark evaluation result message including a recognition result of the position estimation processing.

12. The vehicle position estimation device according to claim 11, wherein:

the landmark information stored in the storage medium further includes, for each landmark, a respective position of the landmark.

13. The vehicle position estimation device according to claim 11, wherein:
the processing unit is further programmed to:
transmit, to a server via a network, an acquisition request for the landmark information that includes travel path information specifying a travel path of the vehicle; and
receive, from the server via the network, the landmark information that has been selected by the server based on the travel path information included in the acquisition request.

14. The vehicle position estimation device according to claim 11, wherein:
the storage medium stores the landmark information for the plurality of landmarks, the landmark information further including, for each landmark, a plurality of respective landmark images of the landmark, each landmark image corresponding to a different environment of the landmark, and
the processing unit is further programmed to:
execute the landmark information selection processing in which the landmark information to be used in the recognition processing is selected from the landmark information stored in the storage medium further based on the landmarks having the respective landmark images that represent an environment of the captured.

15. The vehicle position estimation device according to claim 11, wherein:
the processing unit is further programmed to:
execute the recognition processing in which the characteristic object included in the captured image is recognized as one of the landmarks from the landmark images of the landmark information stored in the second storage medium that represent the environment of the captured image.

16. A vehicle position estimation method performed by an on-board device to estimate a position of a vehicle using an image captured by an image capturing device mounted to the vehicle, the vehicle position estimation method comprising:
receiving captured image information corresponding to the image captured by the image capturing device;
storing landmark information for a plurality of landmarks, the landmark information including, for each landmark, a respective subject recognition range that represents a respective distance range of the landmark, a respective landmark image which is an average of a plurality of respective previous images of the landmark, and a respective recognition evaluation value that represents ease of recognition processing using the respective landmark image;
executing landmark information selection processing in which the landmark information to be used in the recognition processing is selected from the landmark information stored in the second storage medium based on the recognition evaluation values of the landmarks in the landmark information stored in the second storage medium which have the subject recognition ranges that correspond to a first position of the vehicle;
executing the recognition processing in which a characteristic object represented in the captured image information is recognized as one of the landmarks from the landmark images of the selected landmark information stored in the storage medium;
executing position estimation processing in which the first position of the vehicle is corrected to a second position of the vehicle using the information corresponding to the recognized one of the landmarks;
transmitting a landmark evaluation result message including a recognition result of the position estimation processing.

17. The vehicle position estimation method according to claim 16, wherein:
the landmark information further includes, for each landmark, a plurality of respective landmark images of the landmark, each landmark image corresponding to a different environment of the landmark.

18. The vehicle position estimation method according to claim 16, wherein:
the landmark information selection processing in which the landmark information to be used in the recognition processing is selected from the stored landmark information further based on the landmarks having the respective landmark images that represent an environment of the captured image.

19. A device configured to be mounted to a vehicle and to estimate a position of the vehicle, comprising:
a camera device group configured to capture an image from the vehicle;
a storage medium configured to store landmark information for a plurality of landmarks, the landmark information including, for each landmark, a respective subject recognition range that represents a respective distance range of the landmark, a respective landmark image which is an average of a plurality of respective previous images of the landmark, and a respective recognition evaluation value that represents ease of recognition processing using the respective landmark image;
a processing unit programmed to:
execute landmark information selection processing in which the landmark information to be used in the recognition processing is selected from the landmark information stored in the second storage medium based on the recognition evaluation values of the landmarks in the landmark information stored in the second storage medium which have the subject recognition ranges that correspond to a first position of the vehicle;
execute the recognition processing in which a characteristic object included in the captured image is recognized as one of the landmarks from the landmark images of the selected landmark information stored in the storage medium;
execute position estimation processing in which the first position of the vehicle is corrected to a second position of the vehicle using the landmark information corresponding to the recognized one of the landmarks; and
transmit a landmark evaluation result message including a recognition result of the position estimation processing.

* * * * *